United States Patent [19]

Otake et al.

[11] Patent Number: 5,400,052

[45] Date of Patent: Mar. 21, 1995

[54] MOSAIC PICTURE DISPLAY AND EXTERNAL STORAGE UNIT USED THEREFOR

[75] Inventors: Masahiro Otake, Kyoto; Toyofumi Takahashi, Tokyo; Satoshi Nishiumi, Kyoto; Takuo Mukai, Tokyo, all of Japan

[73] Assignees: Nintendo Co., Ltd., Kyoto; Ricoh Co., Ltd., Tokyo, both of Japan

[21] Appl. No.: 138,448

[22] Filed: Oct. 20, 1993

Related U.S. Application Data

[63] Continuation of Ser. No. 793,735, Nov. 19, 1991, abandoned.

[30] Foreign Application Priority Data

Nov. 19, 1990 [JP] Japan .................. 2-315004

[51] Int. Cl.⁶ .............................................. G09G 1/06
[52] U.S. Cl. ...................................... 345/127; 345/141
[58] Field of Search ............... 345/114, 118, 121, 123, 345/116, 141, 127; 358/22, 182, 183; 348/578, 581

[56] References Cited

U.S. PATENT DOCUMENTS

| | | |
|---|---|---|
| 3,936,808 | 2/1976 | O'Neill, Jr. . |
| 4,107,665 | 8/1978 | Mayer et al. ................... 340/731 |
| 4,672,541 | 6/1987 | Bromley et al. . |
| 4,754,270 | 6/1988 | Murauchi ...................... 340/731 |
| 4,824,106 | 4/1989 | Ueda et al. .................... 340/723 |
| 4,888,643 | 12/1989 | Kasakabe ....................... 358/22 |
| 5,125,671 | 6/1992 | Ueda et al. .................... 340/725 |

FOREIGN PATENT DOCUMENTS 0056207 12/1981 European Pat. Off. .

*Primary Examiner*—Ulysses Weldon
*Assistant Examiner*—Regina Liang
*Attorney, Agent, or Firm*—Nixon & Vanderhye

[57] ABSTRACT

A mosaic picture display apparatus includes a picture processing unit and an external storage unit connected thereto. Mosaic size data is programmed in the external storage unit. In response to a control signal which is generated for each mosaic having a mosaic size determined by the mosaic size data at timing of the start thereof, a latch latches still picture character data outputted from a register. Therefore, each of dots in the mosaic is displayed by the same latched character data.

7 Claims, 17 Drawing Sheets

STILL PICTURE PATTERN V COUNT VALUE PROCESSING CIRCUIT — 46

STILL PICTURE PATTERN ADDRESS SELECTION CIRCUIT — 38

| SELECTOR | | OUTPUT | | | | | | | | | | | |
|---|---|---|---|---|---|---|---|---|---|---|---|---|---|
| M2S1 | M2S0 | AC3 | AC4 | AC5 | AC6 | AC7 | AC8 | AC9 | AC10 | AC11 | AC12 | AC13 | AC14 |
| L | L | FVC0 | FVC1 | FVC2 | FVC3 | FVC4 | FVC5 | FVC6 | FVC7 | FVC8 | FVC9 | L | L |
| L | H | M2D0 | FVC0 | FVC1 | FVC2 | FVC3 | FVC4 | FVC5 | FVC6 | FVC7 | FVC8 | FVC9 | L |
| H | L | M2D0 | M2D1 | FVC0 | FVC1 | FVC2 | FVC3 | FVC4 | FVC5 | FVC6 | FVC7 | FVC8 | FVC9 |
| H | H | — | — | — | — | — | — | — | — | — | — | — | — |

MOSAIC PICTURE DISPLAY AND EXTERNAL STORAGE UNIT USED THEREFOR

This is a continuation of application Ser. No. 07/793,735, filed Nov. 19, 1991, now abandoned.

BACKGROUND OF THE INVENTION

1. Field of the Invention

The present invention relates to a mosaic picture display apparatus and an external storage unit used therefor. More particularly, the present invention relates to a mosaic picture display apparatus allowing such picture processors as personal computers and video game machines to mosaically display still pictures thereon.

2. Description of the Prior Art

Japanese Patent Publication No. 2-7478 published on Feb. 19, 1990 (corresponding to U.S. Pat. No. 4,824,106), for example, discloses a picture display apparatus capable of displaying both still and moving pictures.

Where a picture display apparatus of the above-mentioned type is used as a TV game machine, the apparatus should preferably provide an additional capability to display mosaic pictures so as to afford more versatility to the game. Under prior art constraints, displaying a mosaic picture requires a character memory to accommodate graphic data (dot data) on numerous characters constituting the mosaic picture in addition to the ordinary still picture characters. Such a scheme necessitates the use of an expensive memory arrangement of huge capacity not affordable for TV game machines that must be inexpensive in order to be competitive.

SUMMARY OF THE INVENTION

It is therefore a principal object of the present invention to provide a mosaic picture display apparatus which allows mosaic pictures to be displayed with no substantial increase in the memory capacity.

It is another object of the invention to provide a mosaic picture display apparatus with an inexpensive cost.

Briefly described, the present invention is a mosaic picture display apparatus for mosaically displaying on a raster scan monitor a still picture containing an arrangement of a predetermined number of characters each made of a predetermined number of dots in combination, the apparatus comprising: first storing means for storing character data about characters; reading means for reading the character data from the first storing means; register means for converting to bit serial data the character data which is read by the reading means; first mosaic size data outputting means for outputting horizontal mosaic size data corresponding to the number of dots to be mosaically displayed in the horizontal direction on a screen of the raster scan monitor, control signal generating means for generating, in accordance with the horizontal mosaic size data, a control signal for each mosaic at the start thereof in the horizontal direction; holding means for receiving the bit serial character data from the register means and holding the bit serial character data in response to the control signal; and means for generating a video signal in accordance with the bit serial character data from the holding means and supplying the raster scan monitor with the video signal.

The mosaic picture display apparatus according to the invention displays on the raster scan monitor a still picture made of N and M characters in the horizontal and vertical directions respectively, each character being constituted by a predetermined number of dots (e.g., 8×8 dots). A screen RAM that acts as the second storing means stores character codes (names) of the N by M characters that make up the still picture. The first storing means made of a RAM, for example, stores character data (graphic data) on each character. The character data read by the reading means from the first storing means is converted by the register means into bit serial data.

On the other hand, horizontal mosaic size data which is set in a program ROM, for example and which is read therefrom by a CPU is fed to the control signal generating means. Using a counter means, for example, the control signal generating means generates a control signal for each mosaic at every timing of the start thereof in the horizontal direction, the number of dots of each mosaic being determined by the horizontal mosaic size data. Every time the control signal is supplied to the holding means (e.g., latch means), the holding means holds the character data that is outputted by the register means. Since the control signal is outputted at the start of each mosaic, the character data at the start of each mosaic is held by the holding means. Each of the dots in the mosaic is displayed in accordance with the same character data at the start of the mosaic.

In one aspect of the present invention, the above described mosaic size data is stored or programmed in advance in an external storage unit such as a memory cartridge, CD-ROM and etc. The character data may be stored in advance in the external storage unit according to the game, for example.

According to the present invention, mosaic size data is stored, and a control signal is generated on the basis of the mosaic size data, and the character data from the register means is held for the duration of each mosaic according to the control signal. Thus a simple scheme like this still makes it possible to display mosaic pictures.

The objects and other objects, features, aspects and advantages of the present invention will become more apparent from the following detailed description of the embodiments of the present invention when taken in conjunction with accompanying drawings.

DETAILED DESCRIPTION OF THE PREFERRED EMBODIMENTS

Described below is one preferred embodiment of the present invention as it is applied to a TV game machine. It is to be noted in advance that the present invention may also be applied to other picture processors that are connected to a raster scan monitor for use.

First, the raster scan monitor to which the preferred embodiment is applied will be described. The TV game machine generally utilizes an RGB monitor or a CRT display as its monitor. Such raster scan monitors have a screen split into 256 by 256 dots (i.e., pixels). In practice, the number of dots in the vertical direction is reduced to 224 because several top and bottom lines do not accurately display pictures. That is, where each character is made of 8 by 8 dots (one character is the unit of still and moving pictures), one screen may display up to 896 characters (i.e., 32 by 28).

Figure 2:
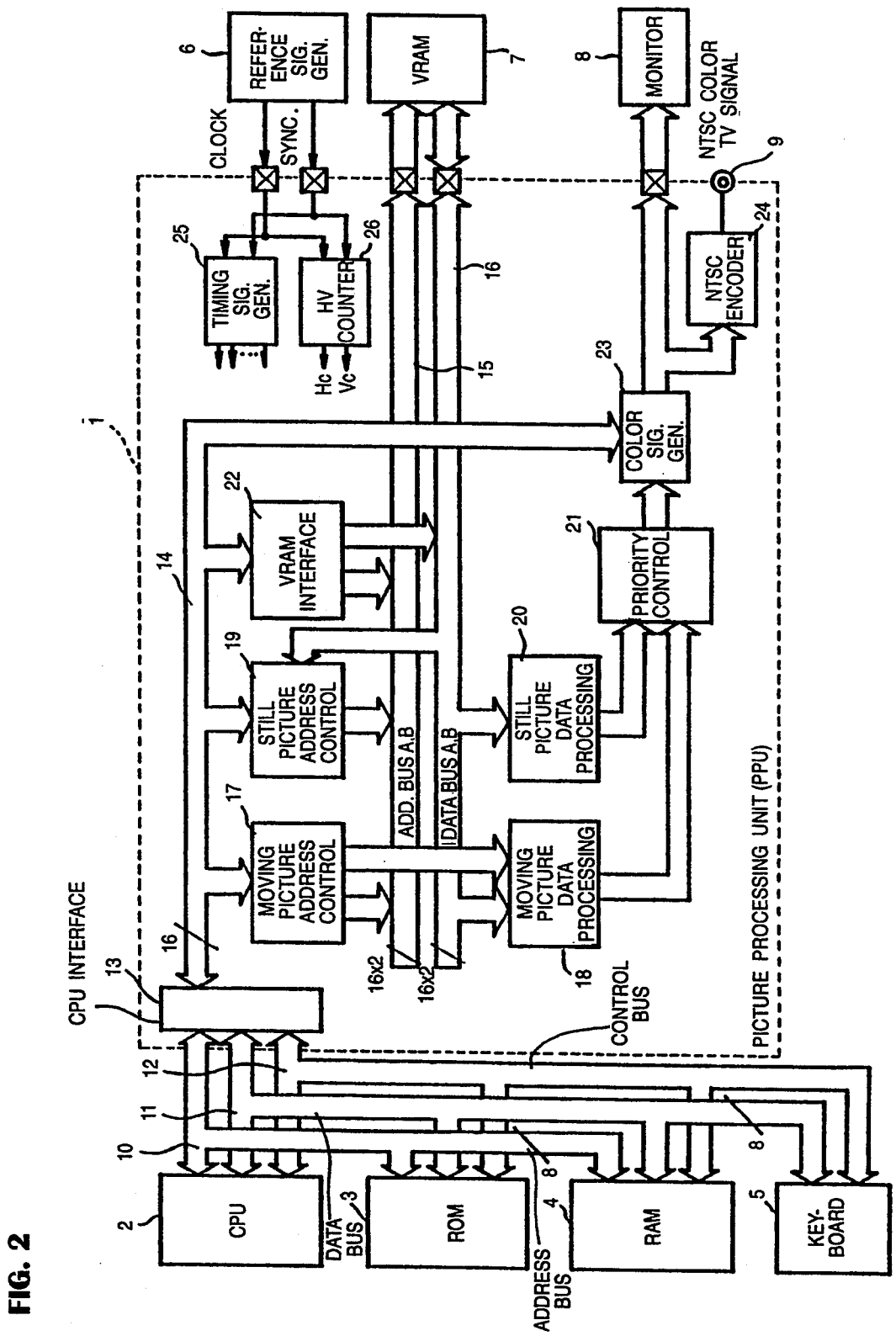
FIG. 2 is a block diagram showing a TV game machine to which the present invention may be applied.

A TV game machine embodying the present invention as shown in FIG. 2 controls a still picture (background) and an moving picture separately, the still picture staying unchanged regardless of the player's manipulations, the moving picture being moved when operated on by the player or controlled by the CPU. This separate picture control scheme of the embodiment is implemented using a picture processing unit 1 which supplies a raster scan monitor 8 with a video signal composed of still and moving pictures. The picture processing unit 1 specifically includes a still picture address control circuit 19 for acquiring that address in a VRAM 7 from which to read still picture data.

In FIG. 2, to a CPU 2 which permits various kinds of control over the TV game machine, a read-only memory (ROM) 3, a RAM 4 and a keyboard 5 are connected via an address bus 10, a data bus 11 and a control bus 12.

The ROM 3 stores program data for controlling the TV game machine, the data for executing the program made of the program data, and character data. The ROM 3 is, for example, composed of a detachable external memory cartridge, not shown. The program data includes various kinds of data: data for determining what kind of moving picture character and/or background picture (still picture) character is to be displayed at which position on the screen with what timing; data such as an offset table for scroll display; and mosaic enable data for designating which still picture (background) cells are to be displayed as a mosaic picture, that is, mosaic enable data and horizontal and vertical mosaic size data.

As will be described hereunder in more detail, the embodiment is constructed to display four still picture cells BG1, BG2, BG3 and BG4. Whether or not to enable each cell for mosaic display is determined on the basis of data BG1EN, BG2EN, BG3EN and BG4EN stored in data bits wd11-wd8 in the program ROM 3. For example, if the data bits wd11-wd8 are set to "0001", only the first still picture cell BG1 is enabled for mosaic display. The mosaic size data is stored in data bits wd12—wd15 in the program ROM 3. In a first mode in which 256 dots are displayed in the horizontal direction on the raster scan monitor 8, the mosaic data "0000", "0001", "0010", "0011", . . . , "1111" respectively designate $1\times1$ dots, $2\times2$ dots, $3\times3$ dots, $4\times4$ dots, . . . , $16\times16$ dots in size. In a second mode in which 512 dots are displayed in the horizontal direction, the mosaic data "0000", "0001", "0010", "0011", . . . , "1111" respectively specify $2\times2$ dots, $4\times4$ dots, $6\times6$ dots, $8\times8$ dots, . . . , $32\times32$ dots in size.

Moving picture attribute data or object attribute data represents moving picture characters. Each moving picture attribute data comprises horizontal position data Hc (8 bits) for designating a horizontal position; vertical position data Vc (8 bits) for specifying a vertical position; name data (9 bits) for defining a character type; a color code (3 bits) for designating a color palette; a flip code (2 bits) for specifying that a character indication is to be inverted in vertically or horizontally symmetrical manner; a size code (1 bit) for defining a character dot size; and priority data (2 bits) for designating the priority of the moving picture relative to that of the still picture.

Each still picture character data comprises name data (8 bits) for designating the kind of character, color data (8 bits) on each of the pixels constituting the character, and etc. A still picture (i.e., background) is constructed by combining a large number of still picture characters. Such still picture character data is written into a screen RAM in the VRAM 7 of FIG. 4, at the memory locations corresponding to those horizontal (H) and vertical (V) positions on the monitor 8 which display the characters, as depicted in FIG. 5. In the example of FIG. 5, a first character is displayed on the monitor 8 at the position represented by H1 and V1, a second character is displayed on the monitor 8 at the position represented by H2 and V2, and a third character at the position represented by H3 and V3.

Figure 4:
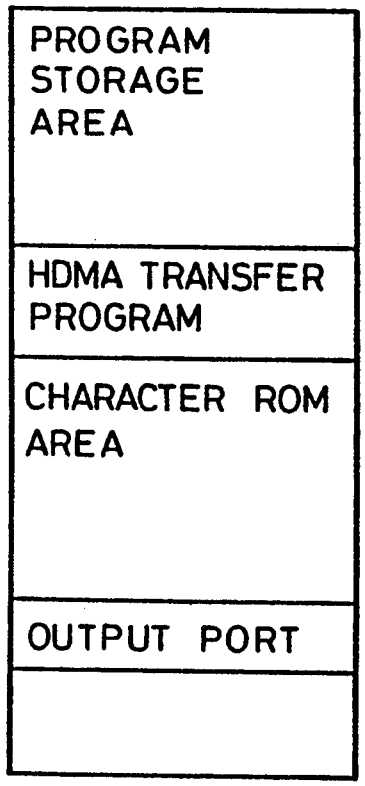
FIG. 4 is an illustrative view showing a memory map in the embodiment.
Figure 4:
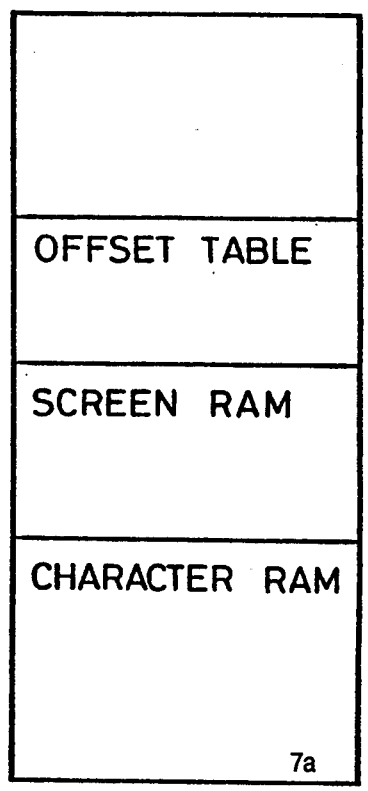
Figures 5, 6:
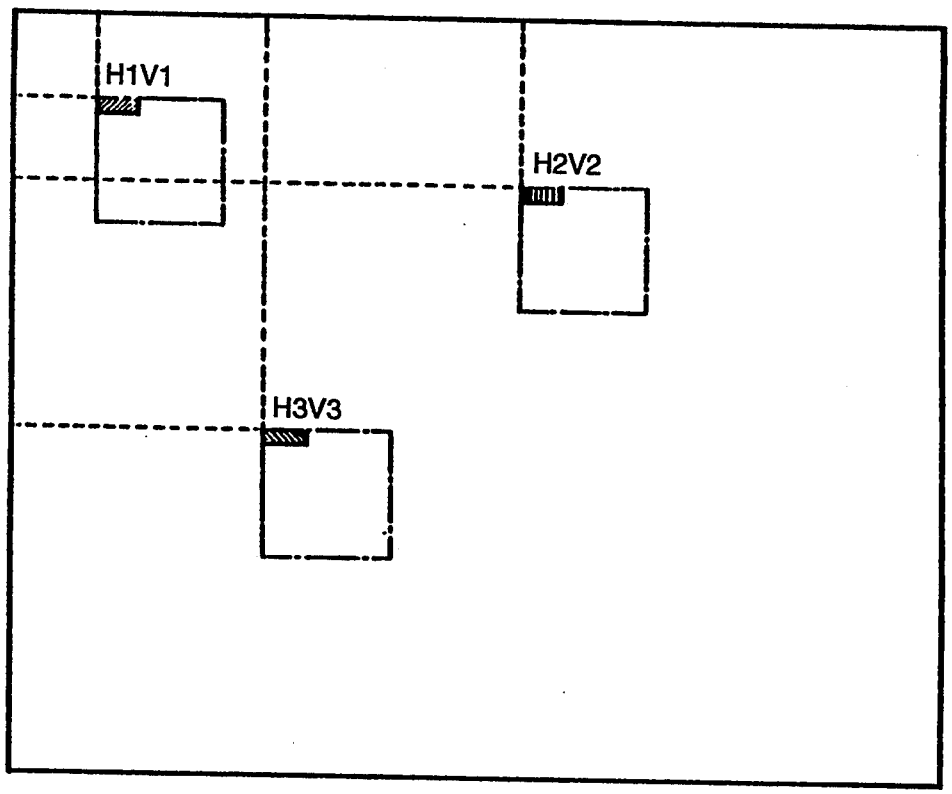
FIG. 5 is an illustrative view showing a monitor screen used to describe a state stored in a screen RAM.
FIG. 6 is an illustrative view showing an offset data table formed in a VRAM.
Figure 7:
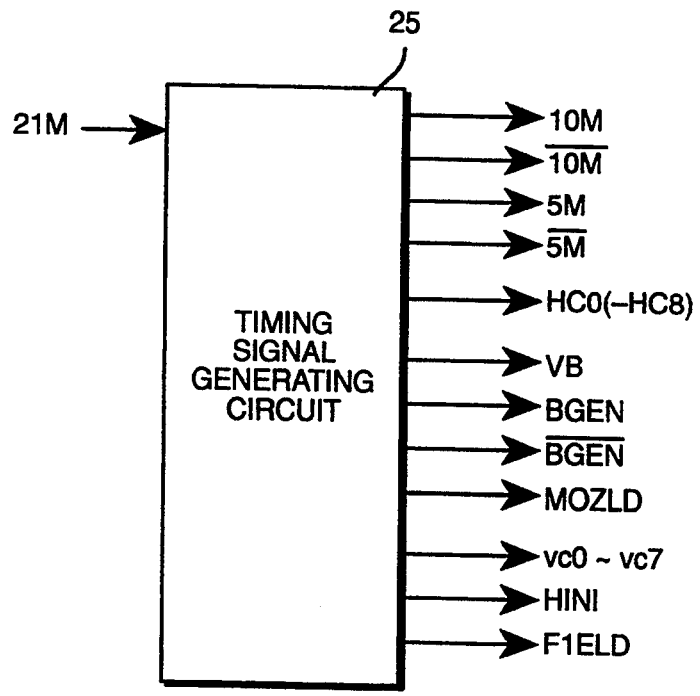
FIG. 7 is a block diagram showing a timing signal generation circuit.

An offset table formed in the VRAM 7 of FIG. 4 stores offset data of characters up to N (N=32 with this embodiment) that may be displayed on a single line, as illustrated in FIG. 6.

A character RAM 7a in the VRAM 7 stores dot data (graphic data) about the still picture characters written in the screen RAM.

The RAM 4 acts as a work area for use by the CPU 2. The keyboard 5 is used by the player to input information for controlling movable characters (moving picture).

The CPU 2 is connected to a CPU interface 13 via the address bus 10, data bus 11 and control bus 12, the interface 13 being contained in the picture processing unit 1. The picture processing unit 1 is connected to a reference signal generator 6 as well as to the VRAM 7 and the raster scan monitor 8.

Under control of the CPU 2, the picture processing unit 1 transfers moving picture data and still picture data to the VRAM 7 during a vertical blanking period or during a forced data transfer period. Then the picture processing unit 1 reads the moving picture and/or still picture data from the VRAM 7 and converts the data, in this embodiment, into an NTSC color TV signal for output.

More specifically, the CPU interface 13 in the picture processing unit 1 is connected to an moving picture address control circuit 17, a still picture address control circuit 19, a VRAM interface 22 and a color signal generation circuit 23 via a data bus 14. The moving picture address control circuit 17 is connected to an address bus 15, and the still picture address control circuit 19 and VRAM interface 22 are connected to the address bus 15 and a data bus 16. The data bus 16 is commonly connected to an moving picture data processing circuit 18 and a still picture data processing circuit 20. The moving picture address control circuit 17 and moving picture data processing circuit 18 perform moving picture or animated picture processing; the still picture address control circuit 19 and still picture data processing circuit 20 carry out still picture processing.

The output of the moving picture data processing circuit 18 and the output of the still picture data processing circuit 20 are sent to a priority control circuit 21. The color signal generation circuit 23 converts the output of the priority control circuit 21 into an RGB signal and supplies the monitor 8 therewith. The signal is then converted by an NTSC encoder 24 into an NTSC color TV signal for output from an output terminal 9.

The picture processing unit 1 further includes a timing signal generation circuit 25 and an HV counter 26. As shown in FIG. 2, the timing signal generation circuit 25 generates, in accordance with a basic clock signal of about 21 MHz from the reference signal generator 6, various timing signals illustrated in FIGS. 7, 8, 9A and 9B.

That is, the timing signal generation circuit 25 outputs signals 10M and/10M (slash "/" in this specification means an inversion) by frequency-dividing the basic clock signal by 2, and outputs signals 5M and/5M by further frequency-dividing the divided signals. One cycle of the signals 5M and/5M corresponds to the display time for one dot (pixel) on the screen of the monitor 8. Thus counting the signal 5M provides a horizontal blanking signal, and counting the horizontal blanking signal allows a vertical blanking signal VB to be obtained.

The HV counter 26 counts the signal 5M from the timing signal generation circuit 26 and accordingly outputs counter data H and V designating display positions on the raster scan monitor 8. The counter data V and H are shown as horizontal position data HC0—HC8 (9 bits) and vertical position data VC0—VC7 (8 bits) for illustrative convenience in FIG. 7. The least significant bit HC0 of the horizontal count value is for use in a subsequent operation, to be described later. A signal BGEN is a signal which enables the VRAM 7 and which is "1" during the display period. A signal/BGEN is an inversion of the signal BGEN. A signal MOZLD is outputted for each line on the raster scan monitor 8 and is used as a mosaic data load timing signal, to be described later. A signal HINI is outputted at the start of scanning of each line. A signal FIELD is outputted as "1" during the display period.

Figure 10:
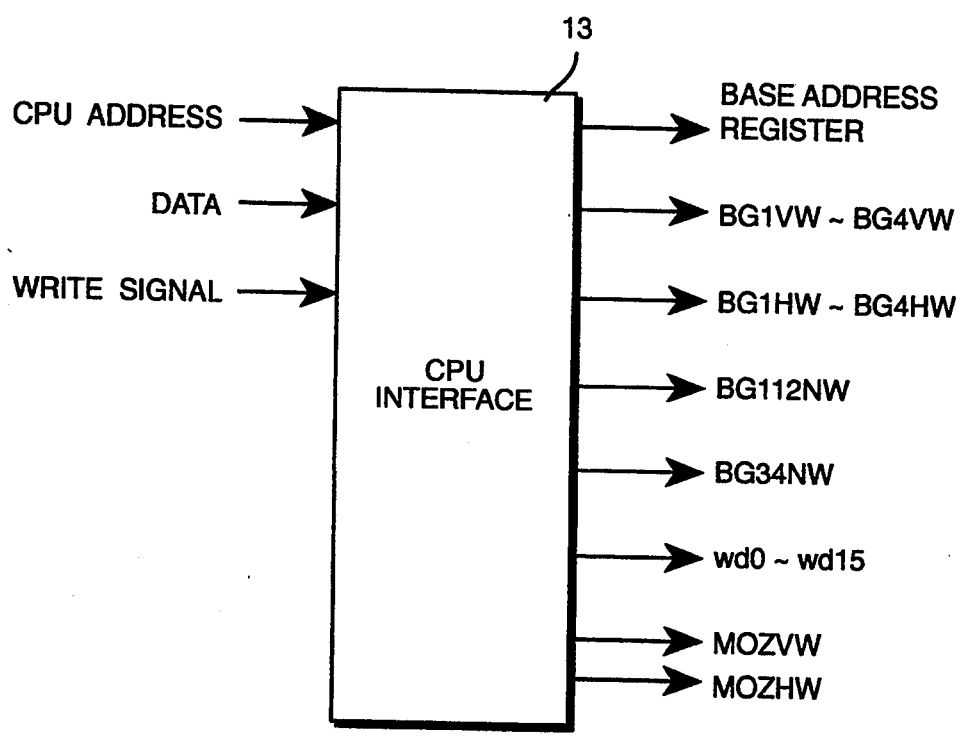
FIG. 10 is a block diagram showing a CPU interface contained in the still picture address control circuit of FIG. 1.
Figure 8:
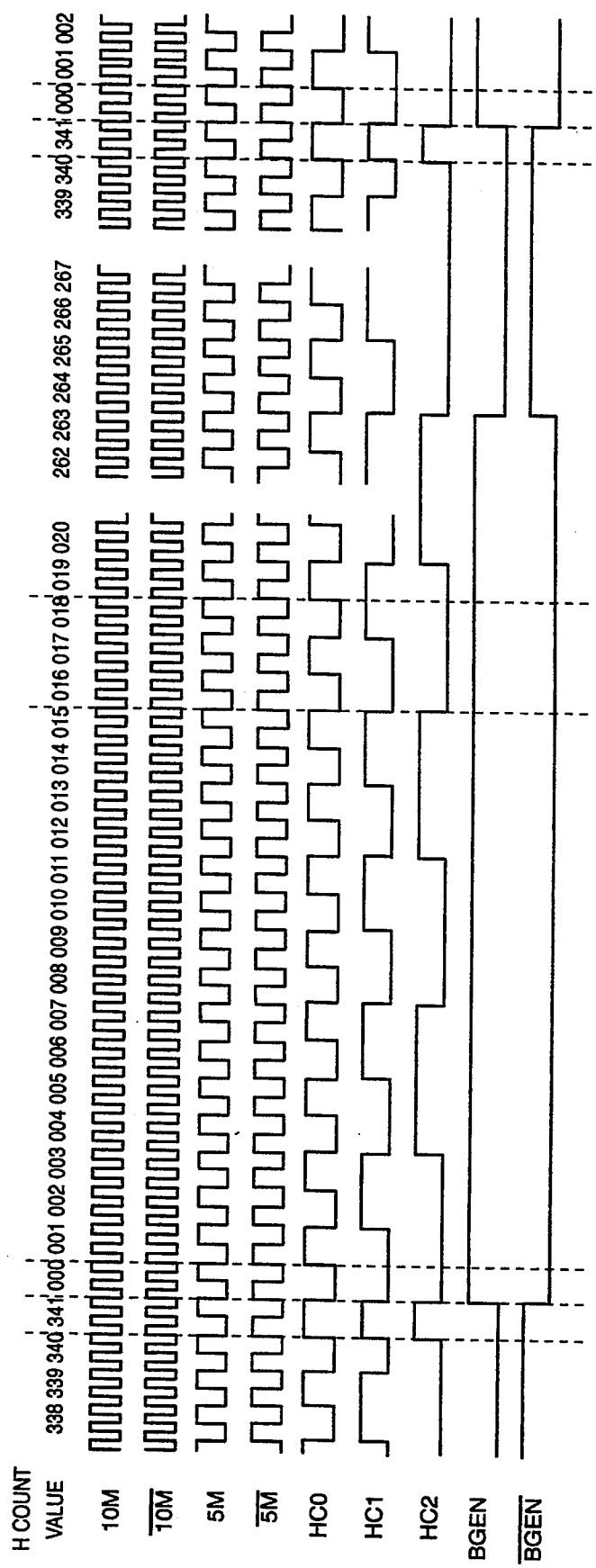
FIGS. 8, 9A and 9B are timing charts showing signals generated by the timing signal generation circuit of FIG. 7.
Figure 9A:
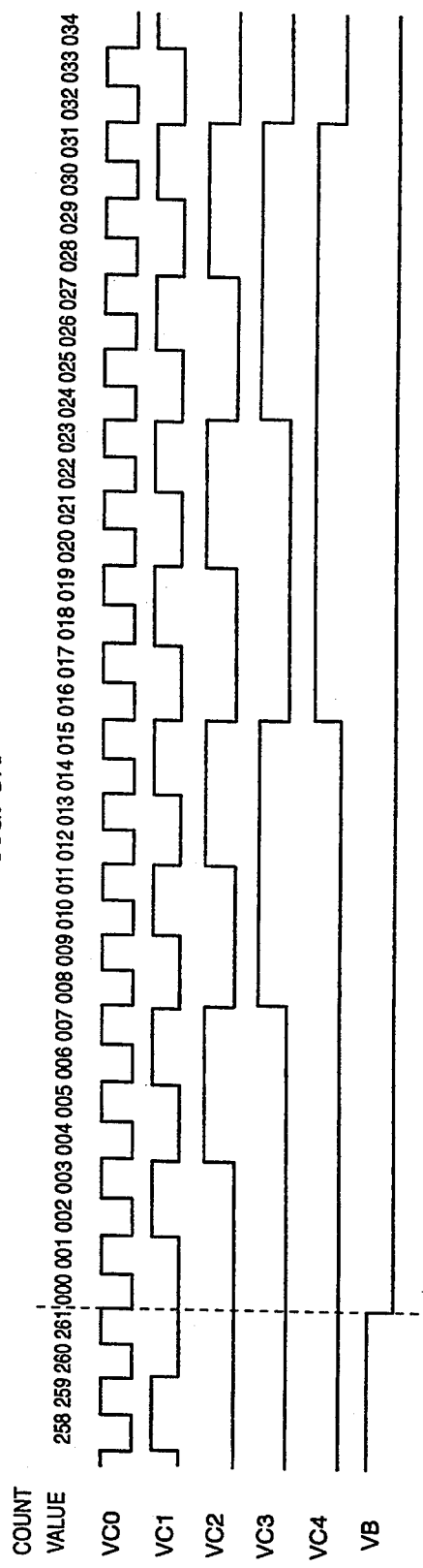
Figure 9B:
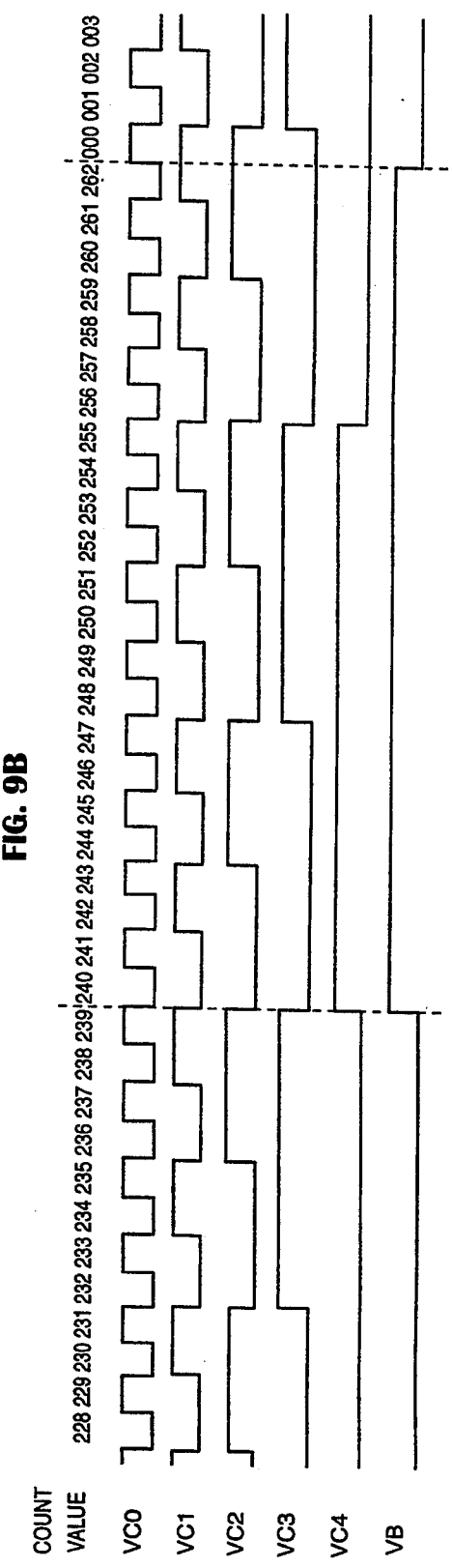

Under control of the CPU 2, the CPU interface 13 transfers to the VRAM interface 22 the data about still and moving picture characters through direct memory access during a vertical blanking period or while a forced data transfer instruction is in effect. The VRAM interface 22, illustrated in FIG. 10, outputs signals BG1VW—BG4VW, BG1HW and BG4HW as write signals to an offset register, to be described later, and signals BG12NW and BG34NW as write signals to a base address register. Data wd0—wd15 from the CPU interface 13 is the data to be written to each register on a write timing. Signals MOZVW and MOZHW are write signals by which to write vertical (V) mosaic size data and horizontal (H) mosaic size data.

The data about still picture characters and moving picture characters sent to the VRAM interface 22 is written beforehand by the interface 22 into the VRAM 7.

The moving picture address control circuit 17 includes an moving picture attribute memory, an in-range detect lob circuit and an moving picture address data generation circuit. Details of such circuits are known illustratively from this applicant's Japanese Patent Laid-Open No. 59-118184 (along with Japanese Patent Publication No. 2-7478, and U.S. Pat. No. 4,824,106). During a given vertical blanking period, the attribute data on 128 moving picture characters is transferred from the CPU 2 to the moving picture attribute memory (object attribute memory) via the CPU interface 13 and data bus 14. The moving picture attribute memory retains the transferred data. On each line, the in-range detection circuit searches the data in the moving picture attribute memory for an moving picture character to be displayed on the next line. The moving picture address data generation circuit generates that address in the VRAM 7 which indicates a position on the screen of the CRT monitor 8, the position representing the detected in-range attribute data inverted when the corresponding vertical flip data is set to "1". The address is outputted via the address bus 15. If the vertical flip data is set to "0", that address in the VRAM 7 which corresponds to the screen position of the character data is outputted unchanged to the VRAM 7 over the address bus 15. In response, the VRAM 7 supplies the moving picture data processing circuit 18 with animated picture color data (4 bits per dot) via the data bus 16. The moving picture color data, stored in a moving picture character area, corresponds to the address from the moving picture address generation circuit in the moving picture address control circuit 17. The moving picture address generation circuit supplies the animated picture data processing circuit 18 directly with the horizontal flip data (1 bit), color data (3 bits) and priority data (2 bits) from among the detected in-range attribute data for moving picture characters.

Thus the moving picture-data processing circuit 18 is fed consecutively with the color data from the VRAM 7 and with the H flip data, color data and priority data directly from the moving picture address control circuit 17. The data is composed of 10 bits per dot, and is inputted for each of the 256 dots per line.

The moving picture data processing circuit 18 temporarily stores the data for the next line that is input during a horizontal blanking period. Then the circuit 18 performs horizontal flip processing by temporarily storing in the reverse order of input the data made of nine bits per dot with the exception of the H flip data involved when that H flip data is set to "1". However, if the H flip data is set to "0", the moving picture data processing circuit 18 temporarily stores the nine-bit-per-dot data in the same order as input. The moving picture data for each temporarily stored line is outputted to the priority control circuit 21 according to the count data H from the HV counter 26 and in synchronism with horizontal scanning.

As will be described later in more detail, on the basis of the control data applied by the CPU 2 and the count data H and V applied by the HV counter 26, the still picture address control circuit 19 computes the read address (16 bits) of the VRAM 7, i.e., screen RAM at which the name data corresponding to the dots of the still picture character is stored in advance. The address is sent to the screen RAM (FIG. 4) in the VRM 7 via the address bus 15.

The screen RAM in the VRAM 7 supplies the still picture address control circuit 19 with the name data via the data bus 15, the data being retrieved from the address designated by the still picture address control circuit 19. Accordingly, upon taking into account the above-mentioned V mosaic size data, the still picture address control circuit 19 supplies the character RAM 7a (FIG. 4) in the VRAM 7, via the address bus 15, with the address composed of the dot position data corresponding to the still picture character display position. From the character RAM 7a in the VRAM 7, the eight-bit color data is read from the address designated by the still picture address control circuit 19, which is sent to the still picture data processing circuit 20 via the data bus 16. In response, the still picture data processing circuit 20 causes a horizontal mosaic control circuit, to be described later, to latch the input color data (b 2 to 8 bits per dot), and forwards the data to the priority control circuit 21 in accordance with the count data from the HV counter 26.

The priority control circuit 21 refers to the priority data for the dot data from two sources: moving picture character dot data from the moving picture data processing circuit 18, and still picture character dot data on four cells coming from the still picture data processing circuit 20. Of the two kinds of dot data, the data with the higher priority is outputted to the color signal generation circuit 23. For example, when the priority data in the moving picture data is "00", the priority control circuit 21 supplies the color signal generation circuit 23 with still picture data composed of high-order three bits "000" and eight-bit color data; when the priority data is "01", the priority control circuit 21 supplies the color signal generation circuit 23 with moving picture data of 7 bits in total which is composed of three-bit color data and four-bit color data.

The color signal generation circuit 23 includes a color table made of a RAM containing eight-bit addresses. During a vertical blanking period, the circuit 23 stores into the color table the color data supplied by the CPU 2. During a horizontal scanning period, on the basis of the eight-bit moving picture or still picture dot data coming from the priority control circuit 21, the color signal generation circuit 23 reads the color data from that address in the color table which is designated. The color data is converted to an RGB signal each color containing five bits. Furthermore, the color signal generation circuit 23 outputs the RGB signal directly to an RGB monitor or to the NTSC encoder 24 in synchronism with the count data H and V from the HV counter 26. The NTSC encoder 24 converts the RGB signal from digital to analog format for each color. The resulting signal is then converted to an NTSC color TV signal for output from the output terminal 9.

Figure 1:
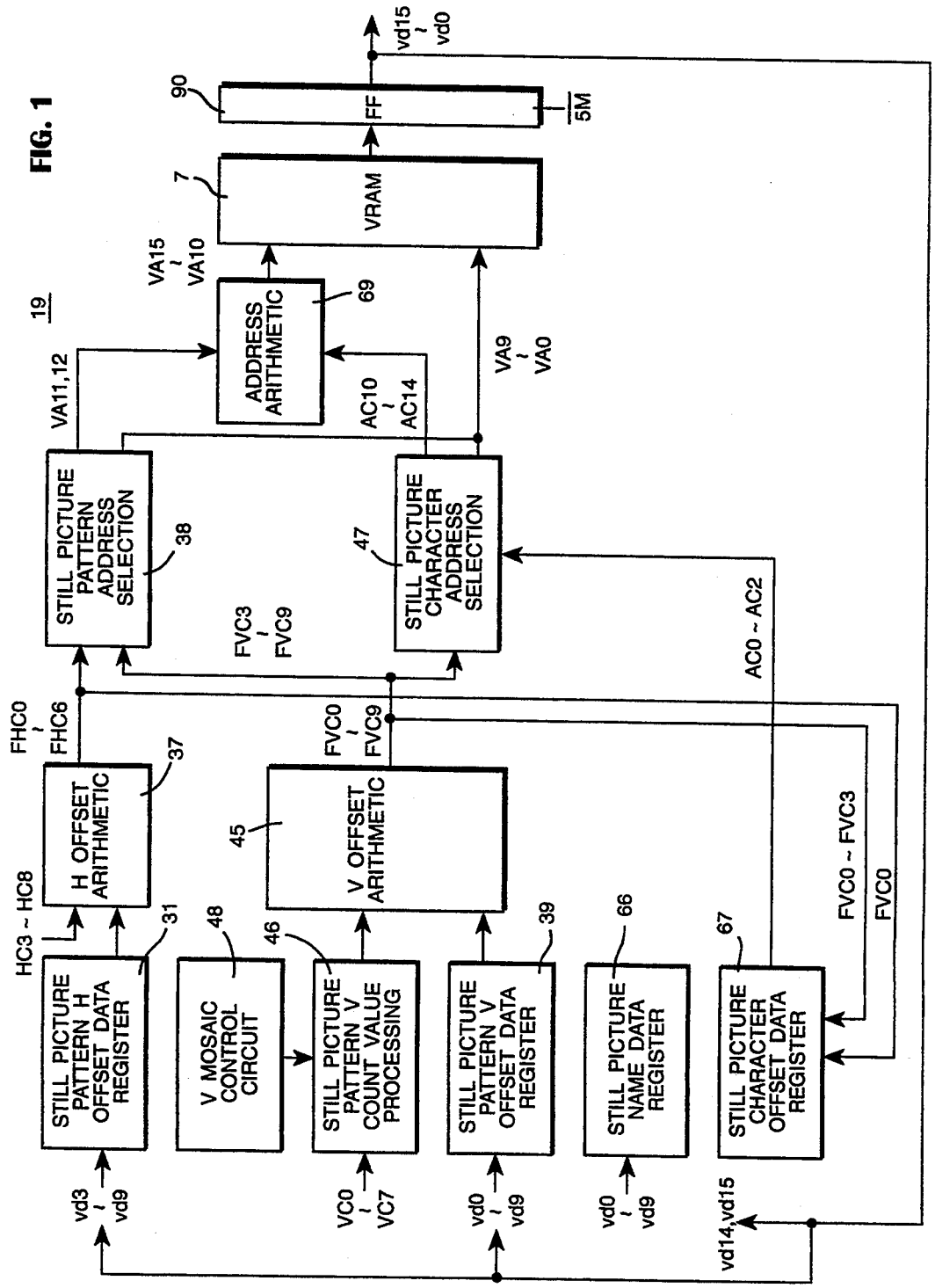
FIG. 1 is a block diagram showing a still picture address control circuit constituting part of one embodiment according to the present invention.

Referring now to FIG. 1, the still picture address control circuit 19 to which the present invention is directed will be described in detail.

Figure 11:
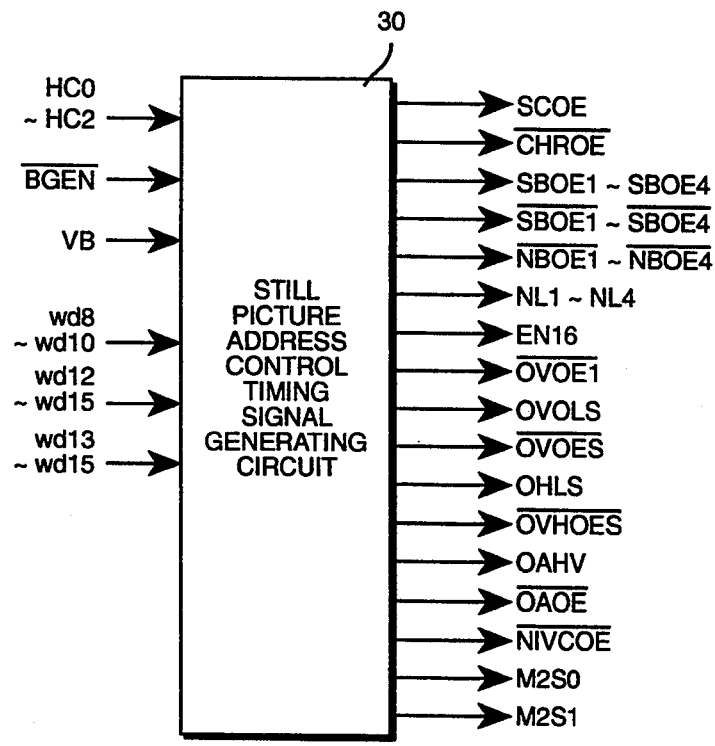
FIG. 11 is a block diagram showing a still picture address control timing generation circuit contained in the still picture address control circuit of FIG. 1.

The still picture address control circuit 19 includes a still picture address control timing signal generation circuit 30 shown in FIG. 11. The circuit 30 outputs various signals when supplied with the timing signals HC0—HC2, /BGEN and VB from the timing signal generation circuit 25 and with the data bits wd0—wd10, wd12—wd15 and vd13—vd15. Signals /SCOE and /CHROE from the circuit 30 enable the screen RAM and the character RAM, respectively. A signal SBOE1—SBOE4 defines the timing on which to read a screen base register. A signal/NBOE1-/NBOE4 specifies the timing on which to read a name base register. A signal NL1—NL4 designates the timing on which to write data to a name register. A signal EN16 is used to change the character size. That is, when set to "1", the signal EN16 indicates characters 16 by 16 dots in size; when set to "0", the signal indicates characters 8 by 8 dots in size. A signal/OVOE1 is a read timing signal for the vertical offset register; a signal OVLS is a write timing signal for a vertical offset change register; a signal /OVOES is a read timing signal for the vertical offset change register; a signal OHLS is a write timing signal for a horizontal offset change register; and a signal /OHOES is a read timing signal for the horizontal offset change register. A signal OAHV distinguishes horizontal data from vertical data in an offset data table. That is, when set to "0", the signal OAHV indicates horizontal data; when set to "1", the signal indicates vertical data. Signals /OAOE and /NIVCOE function as a tri-state buffer control signal each. Signals M2S0 and M2S1 act as cell selection signals which are sent to a still picture character address selection circuit 47 to be described later.

Figure 12:
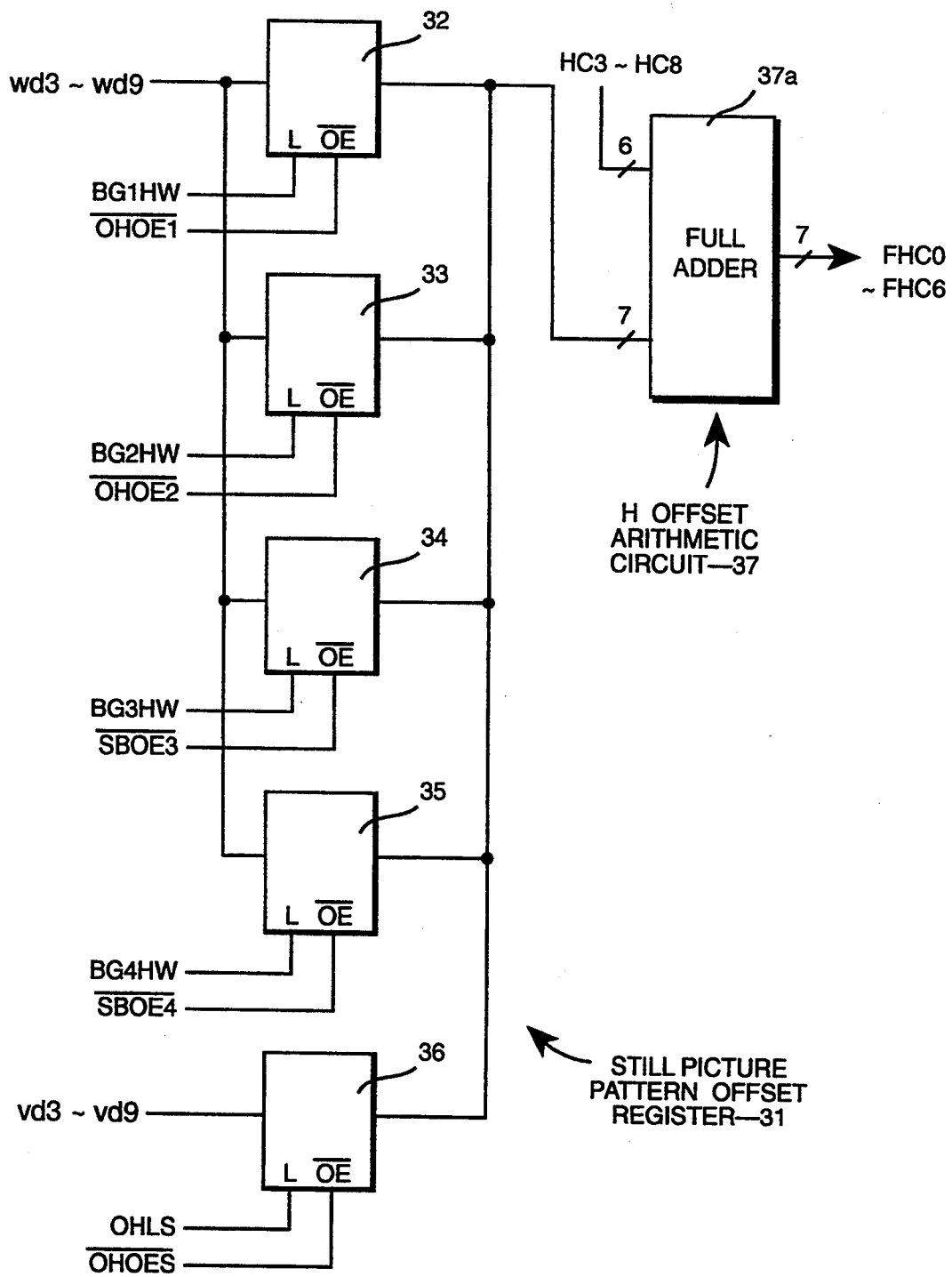
FIG. 12 is a block diagram showing a still picture pattern horizontal offset data register and a horizontal offset arithmetic circuit contained in the still picture address control circuit of FIG. 1.

Referring again to FIG. 1, a still picture pattern horizontal offset data register 31 in the still picture address control circuit 19 receives data bits vd3—vd9 sent over the data bus 14 from the CPU 2, and latches the bits as horizontal offset data. That is, as depicted in FIG. 12, the still picture pattern horizontal offset data register 31 contains horizontal offset registers 32, 33, 34, 35 and 36 each seven bits. The registers 32 and 33 are enabled by the above described signals /OHOE1 and /OHOE2, respectively, and latch data wd3—wd9 in response to signals BG1HW and BG2HW. The registers 34 and 35 are enabled by the above described signals /SBOE3 and /SBOE4, respectively, and latch the data wd3—wd9 in response to a signal BG3HW. The register 36 is enabled by the above described signal /OHOES and latches data vd3—vd9 by responding to the signal OHLS. The data vd3—vd9 is data read from the offset data table (shown in FIGS. 4 and 5).

The data from the register 32 through 36 is sent to a horizontal offset arithmetic circuit 37. As depicted in FIG. 12, the horizontal offset arithmetic circuit 37 contains a full adder 37a. One of the two inputs of the full adder 37a receives the horizontal offset data (7 bits) from the registers 32 through 36. The other input of the full adder 37a admits the horizontal position data HC3—HC8 (6 bits) from the timing signal generation circuit 25. In turn, the full adder 37a (i.e., horizontal offset arithmetic circuit 37) outputs data FHC0—FHC6 indicating the read position in the horizontal direction of the screen RAM (i.e., VRAM 7). The data FHC0—FHC6 is inputted to a still picture pattern address selection circuit 38.

Figure 13:
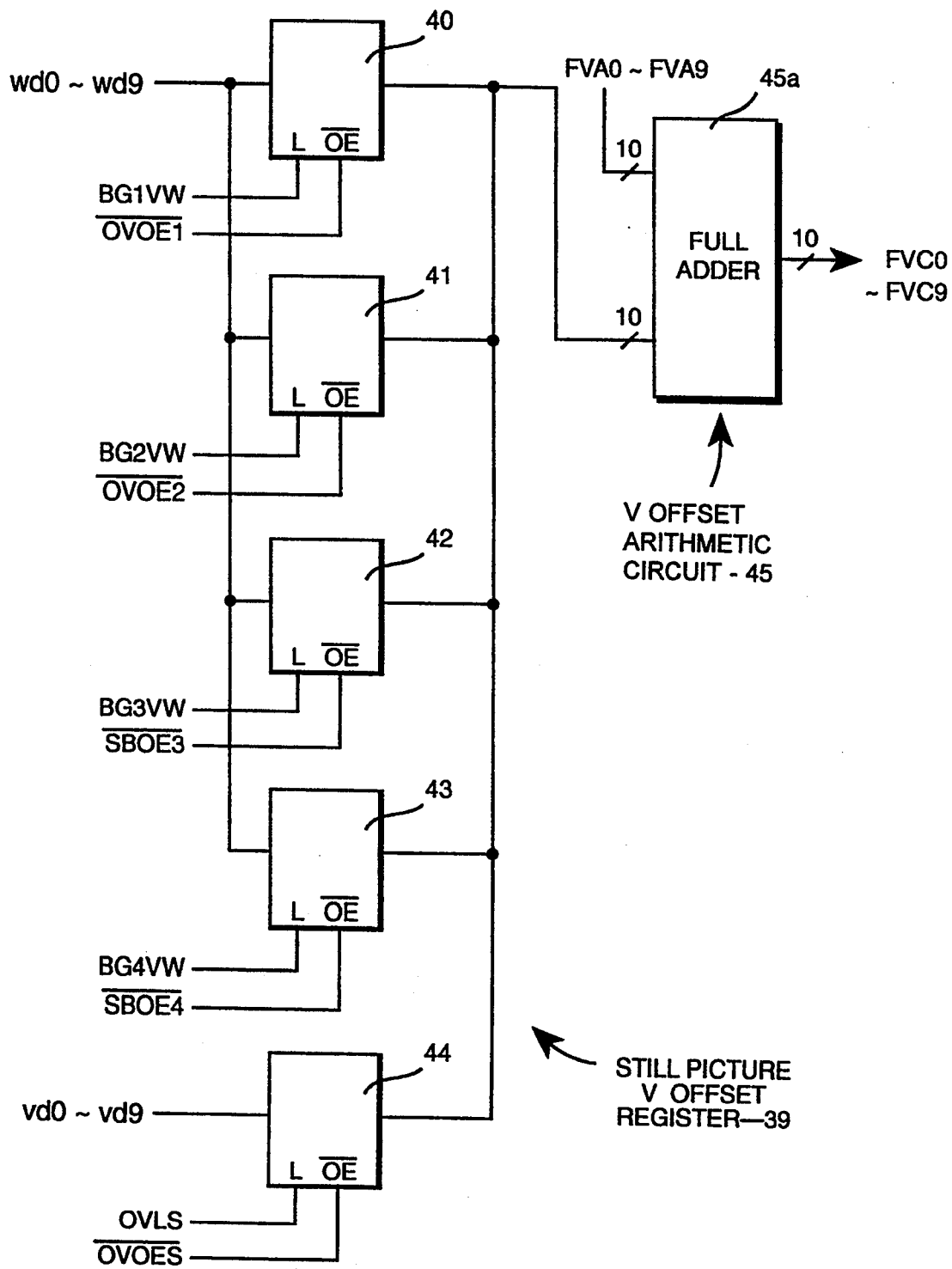
FIG. 13 is a block diagram showing a still picture pattern vertical offset data register and a vertical offset arithmetic circuit contained in the still picture address control circuit of FIG. 1.

A still picture pattern vertical offset data register 39 receives data bits vd0—vd9 sent from the CPU 2 over the data bus 14 and latches the data bits as vertical offset data. As shown in FIG. 13, the still picture pattern vertical offset data register 39 contains vertical offset registers 40, 41, 42, 43 and 44 each seven bits. The registers 40 and 41 are enabled by the above described signals /OVOE1 and /OVOE2, respectively, latching data wd0—wd9 in response to the signals BG1VW and BG2VW. The registers 42 and 43 are enabled by the above described signals /SBOE3 and /SBOE4, respectively, and latch data wd3—wd9 by responding to the signals BG3VW and BG4VW. The register 44 is enabled by the above described signal /OVOES and latches data vd0—vd9 in response to the signal OVLS. The data vd0—vd9 is data read from the offset data table.

The data from the registers 40 through 44 is fed to a vertical offset arithmetic circuit 45. As illustrated in FIG. 13, the vertical offset arithmetic circuit 45 includes a full adder 45a. One of the two inputs of the full adder 45a receives vertical offset data (10 bits) from the registers 40 through 44. The other input of the full adder 45a accepts vertical position data FVA0—FVA9 (10 bits) from a still picture pattern vertical count value processing circuit 46. In turn, the full adder 45a (i.e., vertical offset arithmetic circuit 45) outputs data FVC0—FVC9 indicating the read position in the vertical direction in the screen RAM (i.e., VRAM 7). The data FVC0—FVC9 is inputted to a still picture character address selection circuit 47.

Figure 14:
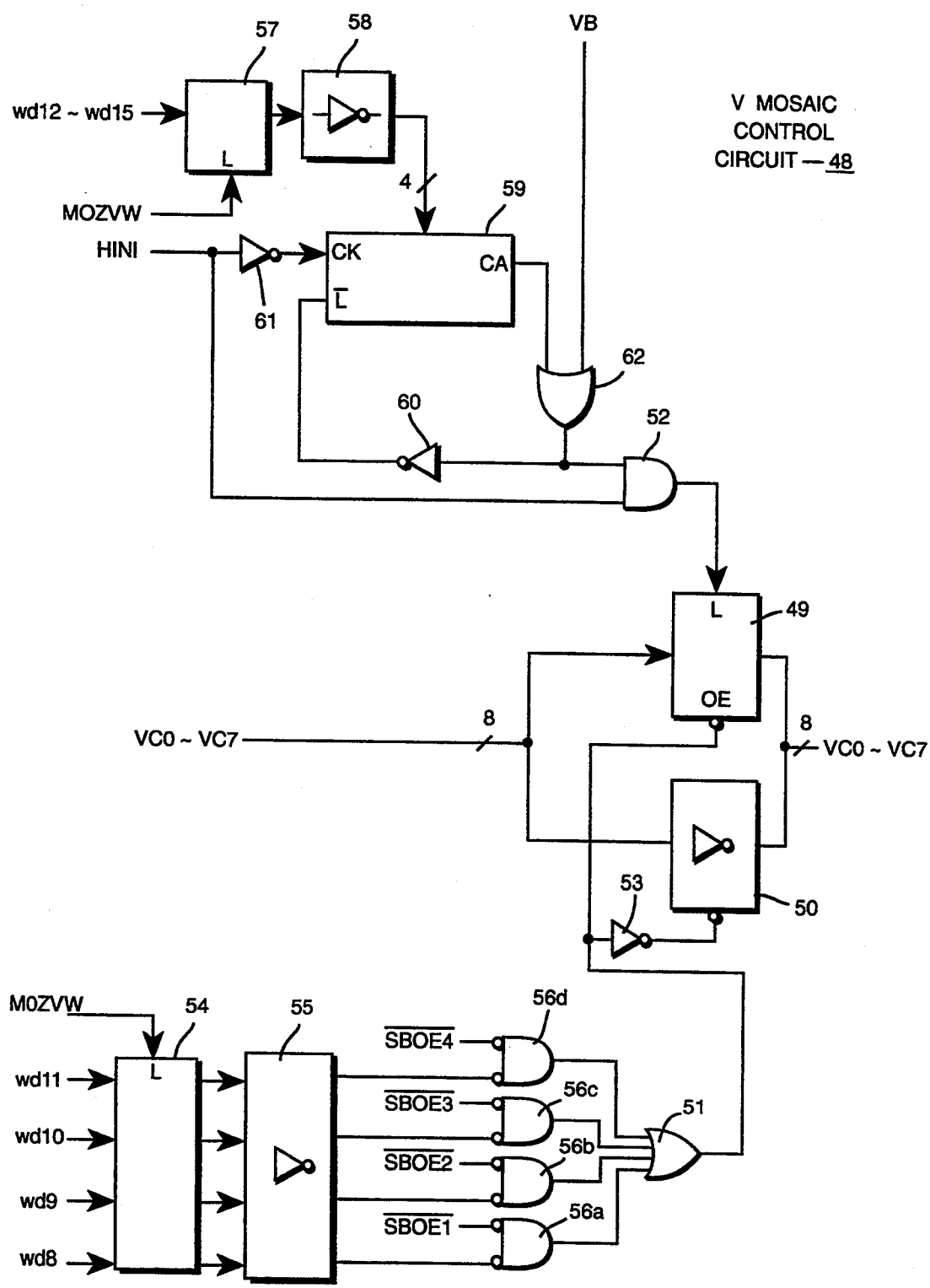
FIG. 14 is a block diagram showing a vertical mosaic control circuit included in the still picture address control circuit of FIG. 1.

As depicted in FIG. 14, a vertical mosaic control circuit 48 includes an eight-bit latch 49 and a tri-state gate 50 in combination. The latch 49 and the gate 50 are commonly supplied with data vc0—vc7 from the timing signal generation circuit 25. The latch 49 is enabled by an enable signal from an OR gate 51 and latches the data vc0—vc7 in response to a latch signal from an AND gate 52. The tri-state gate 50 is enabled by responding to the enable signal from the OR gate 51, the signal having been inverted by a NOT circuit 53. That is, the presence of the enable signal from the OR gate 51 causes the data vc0—vc7 latched in the latch 49 to be outputted; without the enable signal, the data vc0—vc7 is outputted through the tri-state gate 50.

Figure 3:
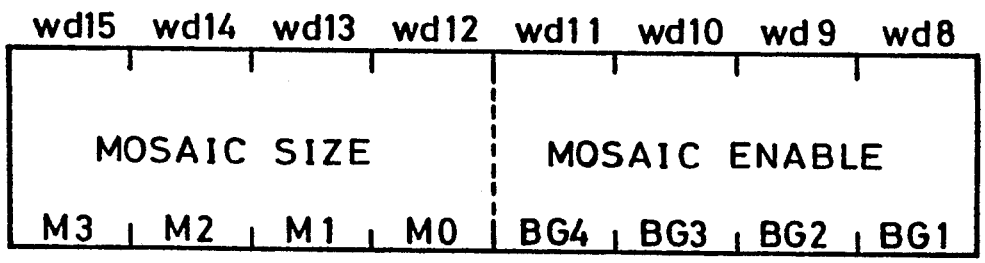
FIG. 3 is an illustrative view showing mosaic data to be set in a program.

Mosaic enable data wd8—wd11 (FIG. 3) is inputted to a latch 54. The latch 54 latches the data by responding to the signal MOZVW from the CPU interface 13.

The respective bits of the mosaic enable data latched in the latch 54 are fed to the inputs on the one side of NOR gates 56a, 56b, 56c and 56d through a NOT circuit 55. The inputs on the other side of the NOR gates 56a, 56b, 56c and 56d are supplied with the above described signals /SBOE1, /SBOE2, /SBOE3 and /SBOE4, respectively. Thus when one of the still picture cells BG1, BG2, BG3 and BG4 is enabled for mosaic display, the corresponding NOR gate 56a, 56b, 56c or 56d outputs a "1". It is at this moment that the OR gate 51 provides the above mentioned latch enable signal.

Data wd12—wd15 (FIG. 3) representing a vertical mosaic size is sent to a latch 57. The latch 57 latches the data by responding to the signal MOZVW. The output of the latch 57 is inverted by a NOT circuit 58 before being supplied as a preset value to a four-bit counter 59. The four-bit counter 59 is constructed as a presettable counter that receives a preset load signal from a NOT circuit 60 and admits the signal HINI as its clock input after inversion by a NOT circuit 61. A carry signal from the four-bit counter 59 and the vertical blanking signal VB are supplied to the NOT circuit 60 via an OR gate 62. The output of the OR gate 62 is sent to one of the two inputs of the AND gate 52. The other input of the AND gate 52 is supplied with the signal HINI.

In this vertical mosaic control circuit 48, an input of the signal MOZVW causes the latches 54 and 57 to latch the mosaic enable data wd8—wd11 and the vertical mosaic size data wd12—wd15, respectively. When one of the still picture cells BG1 through BG4 is enabled for mosaic display, the corresponding NOR gate among 56a through 56d (i.e., NOR gate 51) outputs an enable signal that enables the latch 49. Needless to say, the tri-state gate 50 is disabled at that time.

At the end of the vertical blanking signal VB, the OR gate 62 outputs a signal. In response, the four-bit counter 59 carries out preset-loading of the inverted vertical mosaic size data gained through the NOT circuit 58. The four-bit counter 59 is incremented in response to the start signal HINI for each line. When the value on the counter 59 reaches "1111", the carry signal is outputted. At this timing, the latch 49 is supplied with its latch signal via the AND gate 52 so as to latch the data vc0—vc7. In response to the carry signal, the four-bit counter 59 again performs preset-loading of the output data from the NOT circuit 58.

Thus, the four-bit counter 59 outputs a carry signal for each line count that corresponds to the vertical mosaic size latched in the latch 57. That is, when the latch 49 is arranged to latch the data vc0—vc7 in response to the carry signal, it means that the data vc0—vc7 representing the low-order eight bits of the vertical position data Vp for the raster scan monitor 8 is latched every time a predetermined line count for the current vertical mosaic size is reached. It follows the latch 49 keeps outputting the same vertical position data until the next carry signal is outputted. In this manner, when the incrementing of the vertical address in the VRAM 7 is stopped depending on the vertical mosaic size, the still picture character address selection circuit 47, to be described later, provides the same address over a plurality of lines for the mosaic defined by the vertical mosaic size data. On those multiple lines, the same display persists using the initial line dot data, whereby a vertical mosaic display is achieved.

Figure 15:
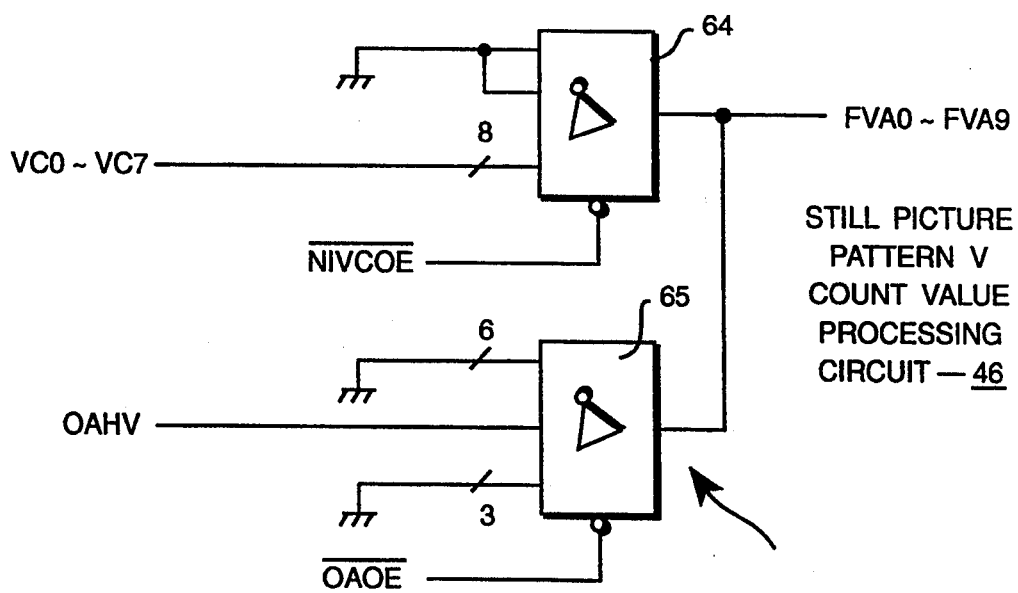
FIG. 15 is a block diagram showing a still picture pattern vertical count value processing circuit contained in the still picture address control circuit of FIG. 1.

As illustrated in FIG. 15, the still picture pattern vertical count value processing circuit 46 contains tri-state gates 64 and 65. The tri-state gate 64 receives vertical position data VC0—VC7 from the latch 49 in the vertical mosaic control circuit 48 (or from the tri-state gate 50); the tri-state gate 65 admits the signal OAHV from the still picture address control timing signal generation circuit 30. The tri-state gates 64 and 65 are controlled by the signals /NIVCOE and /OAOE, respectively. When data is to be read from the offset data table, the signal /OAOE is enabled and the tri-state gate 45 is activated thereby. This causes the tri-state gate 45 to output the data VFA0—VFA9 in which the high-order six bits and the low-order three bits are all zero and only bit 1 is "1". If the offset data table is not referenced, the tri-state gate 64 is enabled. In this case, the tri-state gate 64 outputs the data FVA0—FVA9 in which the high-order two bits are zero and the low-order eight bits are the data VC0—VC7 from the vertical mosaic control circuit 48. In this manner, the still picture pattern vertical count value processing circuit 46 switches input data to the vertical offset operation circuit 45 (discussed with reference to FIG. 13) depending on the need to reference the offset data table.

A still picture name data register 66 receives data bits vd0—vd9 sent from the CPU 2 over the data bus 14, and latches the data bits as name data for still picture characters.

A still picture character offset data register 67 receives the data FHC0 and FVC0—FVC9 from the horizontal offset operation circuit 37 and vertical offset operation circuit 45. In turn, the register 67 outputs data AC0—AC2 indicating one of eight dots vertically constituting one character.

Figure 16:
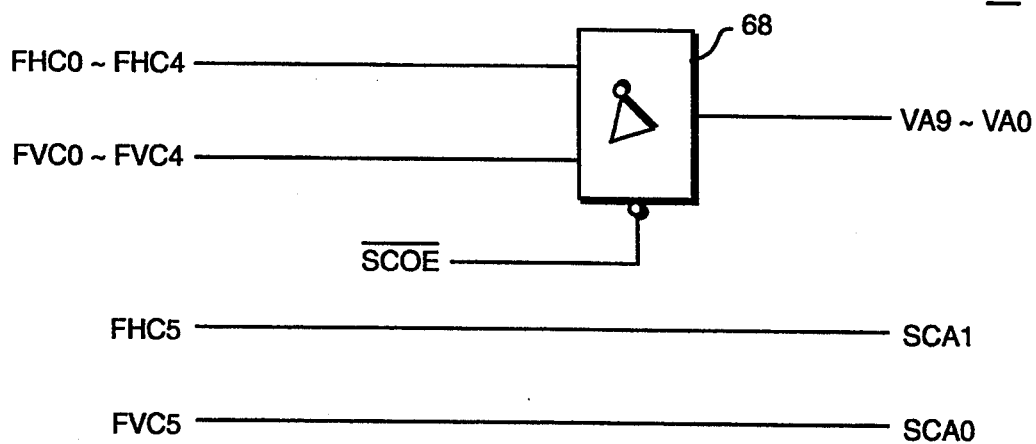
FIG. 16 is a block diagram showing a still picture pattern address selection circuit contained in the still picture address selection circuit of FIG. 1.

As shown in FIG. 16, the still picture pattern address selection circuit 38 includes a tri-state gate 68. The tri-state gate 68 receives as its control signal the signal /SCOE from the still picture pattern address control timing signal generation circuit 30. As its input, the tri-state gate 68 receives data FHC0—FHC4 (5 bits) from the horizontal offset arithmetic circuit 37 and data FVC0—FVC4 (5 bits) from the vertical offset arithmetic circuit 45. When the signal /SCOE is enabled, the tri-state gate 68 outputs data VA0—VA9. The data VA0—VA9 constitutes the low-order address of the screen RAM and is given to an address arithmetic circuit 69. The data FHC5 and FVC5 entered into the still picture pattern address selection circuit 38 are outputted unchanged as data SCA1 and SCA0, respectively. The data SCA1 an SCA0, fed to the address arithmetic circuit 69, constitute the address at which to read the offset data table.

Figure 17:
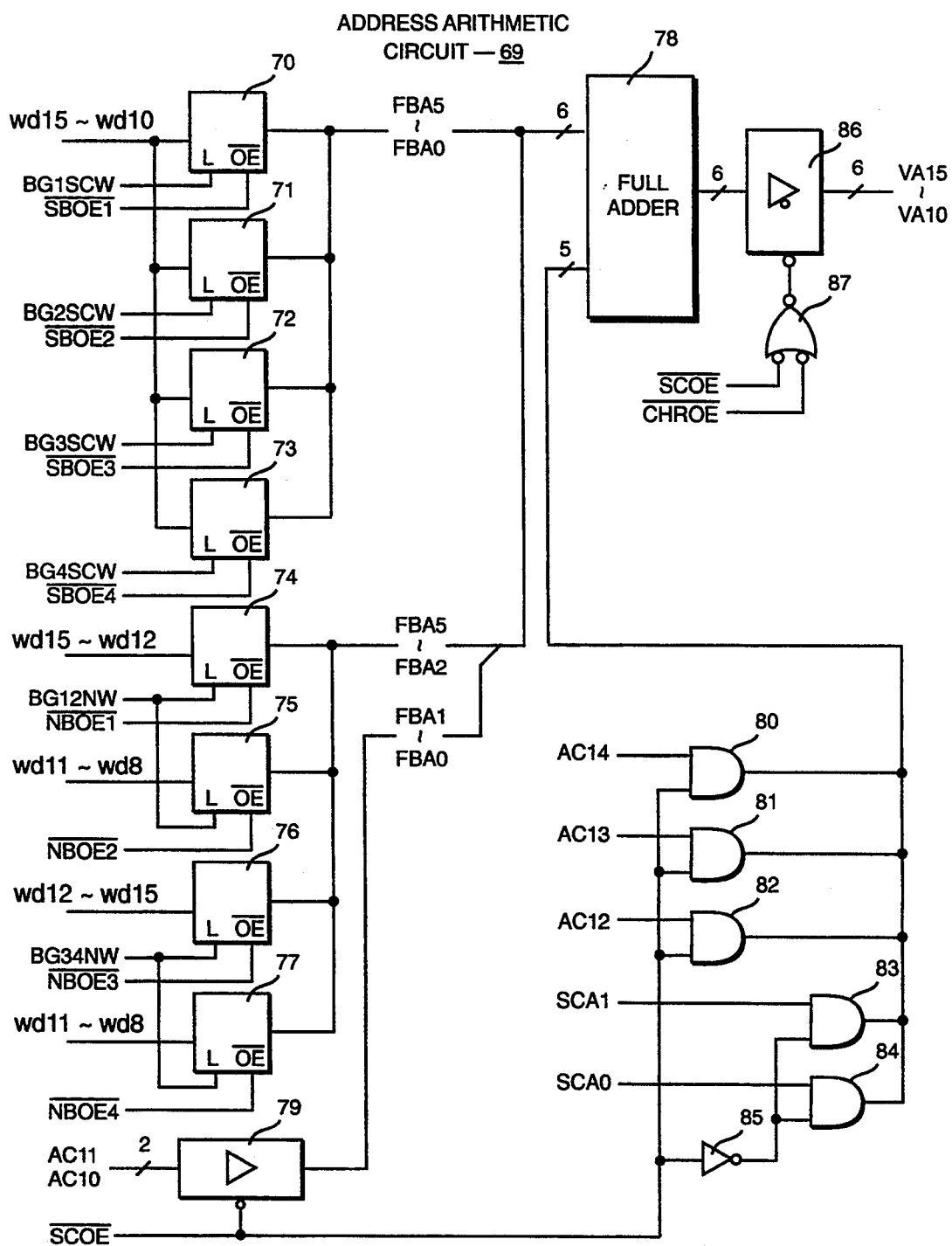
FIG. 17 is a block diagram showing an address arithmetic circuit contained in the still picture address control circuit of FIG. 1.

As illustrated in FIG. 17, the address arithmetic circuit 69 comprises screen base address registers 70, 71, 72 and 73 and name base address registers 74, 75, 76 and 77. The screen base address registers 70, 71, 72 and 73 are enabled by the signals /SBOE1, /SBOE2, /SBOE3 and /SBOE4, respectively, when name data is read from the screen RAM; the registers 70 through 73 latch data wd15-wd10 in response to signals BG1SCW, BG2SCW, BG3SCW and BG4SCW, respectively. The name base address registers 74, 75, 76 and 77 are enabled by the signals /NBOE1, /NBOE2, /NBOE3 and /NBOE4, respectively, when dot data is read from the character RAM 7a; the registers 74 through 77 latch data wd15—wd15 and wd11-wd8 by responding to the signals BG12NW and BG34NW. One of the two inputs of a full adder 78 is supplied with data FBA5-FBA0 (6 bits) from the registers 70 through 73 and from the registers 74 through 77.

The address arithmetic circuit 69 also contains a tri-state gate 79. The tri-state gate 79 receives the signal /SCOE as its control signal and admits AC11 and AC10 as its input. Output data FBA1 and FBA0 from the tri-state gate 79 are sent, along with output data FBA5—FBA2 from the name base address registers 74 through 77, to one of the two inputs of the full adder 78.

The signal /SCOE is commonly fed to the inputs on the one side of AND gates 80, 81 and 82. A signal SCOE, obtained by having a NOT circuit 85 invert the signal /SCOE, is sent to the inputs on the one side of AND gates 83 and 84. The inputs on the other side of the AND gates 80, 81 and 82 are supplied with data AC14, AC13 and AC12. The inputs on the other side of the AND gates 83 and 84 are fed with the data SCA1 and SCA0 from the still picture pattern address selection circuit 38. The output of the AND gates 80 through 84 (5 bits) is sent to the other input of the full adder 78.

When name data is read from the screen RAM, the data SCA0—SCA1 is added by the full adder 78 as the increment relative to the base address. When dot data (graphic data) is read from the character RAM, the data AC12—AC14 representing the increment relative to the base address is added by the full adder 78. Thus the AND gates 80 through 84 switch the above two kinds of increment data using the signal /SCOE, and supply the full adder 78 with the selected increment data.

The full adder 78 outputs high-order address data VA10—VA15 for the VRAM 7. The address data is outputted through a tri-state buffer 86 controlled with the output of an AND gate 87. The two inputs of the AND gate 87 receive the signals /SCOE and /CHROE.

Figure 18:
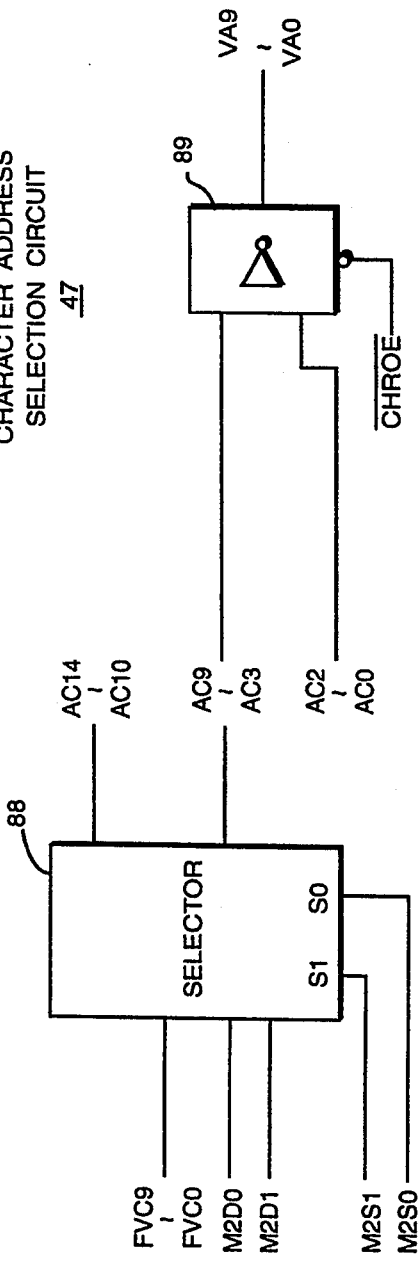
FIG. 18 is a block diagram showing a still picture character address selection circuit contained in the still picture address control circuit of FIG. 1.

As shown in FIG. 18, the still picture character address selection circuit 47 includes a selector 88 and a tri-state gate 89. The selector 88 is supplied with data FVC0—FVC9, M2D0 and M2D1. As its selection signal, the selector 88 receives data M2S1 and M2S0. Depending on the selection signals received, the selector 88 outputs data AC3—AC14 varying as depicted in the table of FIG. 18. The VRAM 7 is fed with the data AC3—AC14 as the low-order address of the character RAM together with the high-order address from the address arithmetic circuit 69.

The dot data vd0—vd15 read from the VRAM 7 (i.e., character RAM 7a) is outputted via a latch 90 (FIG. 1). The dot data vd0—vd15 is sent to the still picture data processing circuit 20 (FIG. 2).

Figure 19:
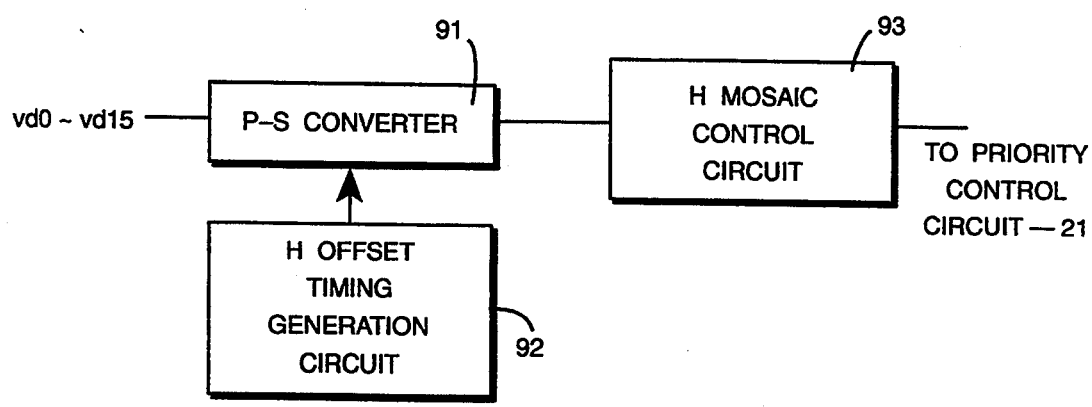
FIG. 19 is a block diagram showing a still picture data processing circuit included in FIG. 2.

As illustrated in FIG. 19, the still picture data processing circuit 20 contains a P-S converter 91 and a horizontal offset timing generation circuit 92. The P-S converter 91 includes a shift register. The horizontal offset timing generation circuit 92 supplies the P-S converter 91 with a timing signal for outputting dot data as a bit serial signal. The bit serial dot data from the P-S converter 91 is sent to a horizontal mosaic control circuit 93.

Figure 20:
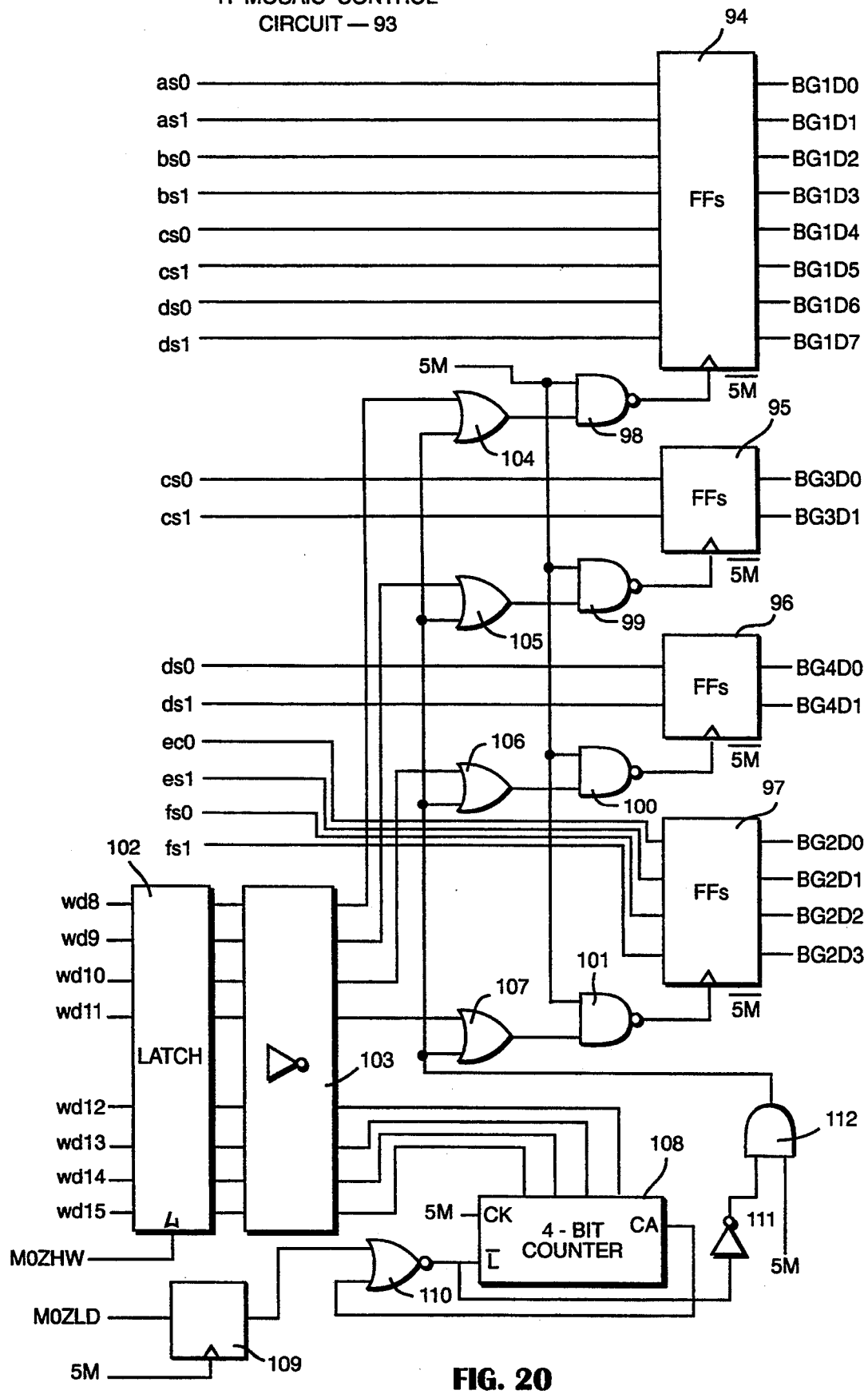
FIG. 20 is a block diagram showing a horizontal mosaic control circuit contained in the still picture data processing circuit of FIG. 19.

As depicted in FIG. 20, the horizontal mosaic control circuit 93 comprises latches 94, 95, 96 and 97. The latch 94 receives eight-bit data as0, as1, bs0, bs1, cs0, cs1, ds0 and ds1 from the P-S converter 91. The latch 95 admits two-bit data cs0 and cs1, the latch 96 two-bit data ds0 and ds1, and the latch 97 four-bit data es0, es1, fs0 and fs1. The latches 94, 95, 96 and 97 latch their respective data in response to the latch signal /5M from NAND gates 98, 99, 100 and 101. The output of the latch 94 is outputted as dot data BG1D0—BG1D7 of the first still picture cell BG1. The latch 95 outputs dot data BF3D0 and BG3D1 of the third still picture cell BG3; the latch 96 outputs dot data BG4D0 and BG4D1 of the fourth still picture cell BG4; and the latch 97 outputs dot data BG2D0—BG2D3 of the second still picture cell BG2. The dot counter varies with each of the still picture cells BG1 through BG4 because the number of colors that may be displayed varies depending on the cell. With this embodiment shown, the first still picture cell BG1 can display the largest number of colors.

On the other hand, mosaic size enable data wd8—wd11 and mosaic size data wd12—wd15 are fed to a latch 102. The latch 102 receives the signal MOZHW as its latch signal. The output of the latch 102 is inverted by a NOT circuit 103. After inversion by the NOT circuit 103, the bits of the mosaic enable data are supplied to the inputs on the one side of OR gates 104, 105, 106 and 107. The outputs of the OR gates 104 through 107 are sent to the inputs on the one side of the NAND gates 98 through 101, respectively. The inputs on the other side of the NAND gates 98 through 101 are supplied with the timing signal 5M which comes from the timing signal generation circuit 15 and which corresponds to one dot.

The horizontal mosaic control circuit 93 further includes a presettable four-bit counter 108 that receives an inversion of the horizontal mosaic size data from the NOT circuit 103. The four-bit counter 108 acts in the same manner as the four-bit counter 59 shown in FIG. 14.

A latch 109 is provided to latch the signal MOZLD in response to the timing signal 5M. The output of the latch 109 is sent to a NOR gate 110 together with the carry signal from the four-bit counter 108. The four-bit counter 108 performs preset-loading of an inversion of the horizontal mosaic size data by responding to the signal from the NOR gate 110. The output of the NOR gate 110 is inverted by a NOT circuit 111 and fed to one of the two inputs of an AND gate 112. The other input of the AND gate 112 is supplied with the timing signal 5M. The output of the AND gate 112 is sent to the inputs on the other side of the above-mentioned OR gates 104 through 107. Thus every time a carry signal is outputted by the four-bit counter 108, the AND gate 112 outputs a "1". In response, the NAND gates 98 through 101 output the signal /5M, i.e., an inversion of the timing signal 5M. The signal /5M is supplied as the latch signal to the latches 94 through 97.

In the horizontal mosaic control circuit 93, an entry of the signal MOZHW causes the latch 102 to latch mosaic enable data wd8—wd11 and horizontal mosaic size data wd12—wd15. Where one of the still picture cells BG1 through BG4 is enabled for mosaic display, the corresponding OR gate among 104 through 107 outputs a signal that is fed to the NAND gates 98 through 101.

Meanwhile, the latch 109 latches the signal MOZLD in response to the timing signal 5M. The NOR gate 110 outputs a preset load signal. In turn, the four-bit counter 108 performs preset-loading of the inverted horizontal mosaic size data obtained through the NOT circuit 103. The four-bit counter 108 is incremented for each dot on the screen, i.e., every time the timing signal 5M is given. When its value reaches "1111", the four-bit counter 108 outputs a carry signal. It is at this point that a load signal is obtained through the NOR gate 110. Thus the four-bit counter 108 again performs preset-loading of the output data from the NOT circuit 103.

In this manner, the four-bit counter 108 outputs a carry signal for each of the dots corresponding to the horizontal mosaic size latched in the latch 102. This means that when the latches 94 through 97 latch dot data in response to each carry signal, the dot data is updated for each of the dots constituting the horizontal mosaic size. Thus the latches 94 through 97 keep outputting the same dot data until the next carry signal is outputted. In this manner, when dot data is latched at the beginning of a mosaic defined by a horizontal mosaic size, the same dot data is provided over a plurality of dots constituting that mosaic. Thus the same display persists over the multiple dots using the initial dot data, whereby a horizontal mosaic display is attained.

Below is a description of a scrolling process that utilizes offset data. This process is described here in consideration of its indirect relevance to the invention. During an initialization period or a vertical blanking period, the CPU 2 writes to the VRAM 7 still picture pattern data (screen data), dot data on each character and offset change data via the VRAM interface 22. During the same period, the CPU 2 writes data to the relevant registers contained in the still picture address control circuit 19 and control data processing circuit 20 via the CPU interface 13.

The horizontal offset operation circuit 37 adds the horizontal offset data from the still picture pattern horizontal offset data register 31 and the horizontal count value. On the other hand, the vertical offset operation circuit 45 adds the vertical offset data from the vertical offset data register 39 and the output from the still picture pattern vertical count value processing circuit 46. The output from the circuit 46 is basically a vertical count value.

The still picture pattern address selection circuit 38 is supplied with the output from the horizontal offset operation circuit 37 and with the outputs FHC0—FHC6 and FVC3—FVC9 from the vertical offset operation circuit 45. The still picture character offset data register 67 is fed with the output FVC0—FVC3 from the vertical offset operation circuit 45 and with the output FHC0 from the horizontal offset operation circuit 37. These outputs are latched by the circuit 67 as character offset data.

The still picture pattern address selection circuit 38 translates the received data depending on the character size and other parameters and outputs the translated data. Ten-bit data VA0—VA9 is given as the address of the VRAM 7. The address arithmetic circuit 69 outputs an address VA10—VA15 gained by adding the increment data to the base address. Thus the VRAM 7 is addressed by 16-bit data VA0—VA15. The data read from the VRAM 7 is retained by the still picture name register 66 as still picture pattern data (screen data).

The offset change data read from the VRAM 7 is retained by the still picture pattern horizontal offset data register 31 and by the still picture pattern vertical offset data register 67. Subsequent steps then take place as described earlier.

The character name data which is read from the VRAM 7 in the above screen process and which is retained by the still picture name data register 66 is sent to the vertical offset operation circuit 45 as data FVA-0—FVA9. In this case, the vertical offset operation circuit 45 acts as a character offset operation circuit and, in the manner described, feeds address data FVC0—FVC9 to the still picture character address selection circuit 47. In turn, the still picture character address selection circuit 47 translates the data FVC0—FVC9 in accordance with the cell selection signals M2S0 and M2S1 from the still picture address control timing signal generation circuit 30. The result is outputted as data AC3—AC14. Data AC10—AC14 is fed to the address arithmetic circuit 69, while data AC-3—AC9 is supplied along with the above data AC-0—AC2 as the address VA0—VA9 of the VRAM 7. The address arithmetic circuit 69 adds the data AC10—AC14 and the value from the name base address registers. The result is outputted as the address VA10—VA15 of the VRAM 7. Thus the dot data about the still picture character in question is read from the VRAM 7.

The P-S converter 91 outputs the above character dot data as bit serial dot data in response to a conversion timing signal from the character offset timing generation circuit 92.

Figure 21:
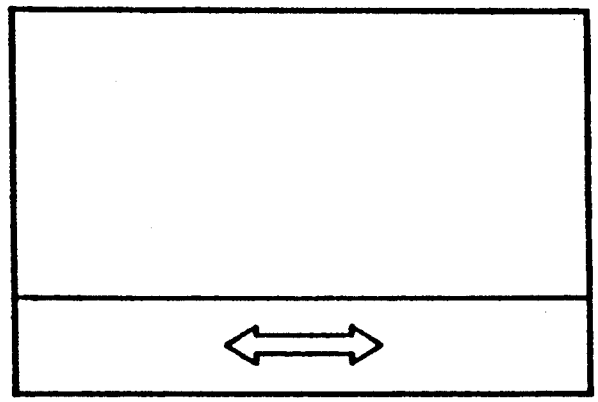
FIGS. 21 and 22 are illustrative views showing how scrolls take place on a monitor screen.
Figure 22:
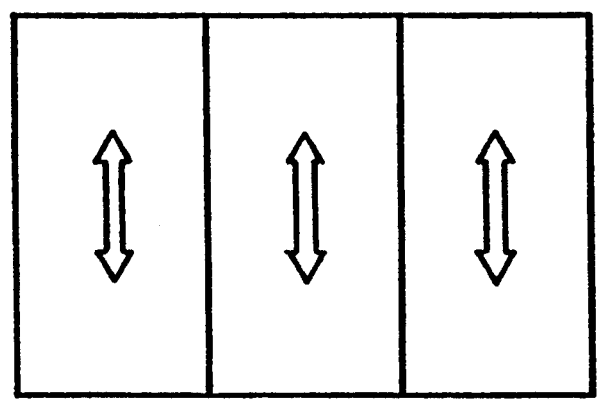

With this embodiment, simply setting offset data to the offset data table and having the CPU supply initial offset data readily scrolls still picture characters in the vertical direction inside horizontally divided monitor screen parts, as shown in FIG. 22. Needless to say, the embodiment also permits horizontal scroll in a vertically divided screen part as depicted in FIG. 21. Where the horizontal and vertical scroll features are combined, more versatile scroll operations are available.

Below is a description of how a mosaic picture is displayed. As described earlier, the vertical mosaic control circuit 48 has its four-bit counter 49 (FIG. 14) output a carry signal depending on the mosaic size data. The latch 49 latches the low-order eight bits vc0—vc7 of the vertical position data during the period corresponding to the line count designated by the vertical mosaic size data. During the same period, the data vc0—vc7 fed to the still picture pattern vertical count value processing circuit 46 is outputted unchanged. As described, the data vc0—vc7 is processed by the vertical offset operation circuit 45 and by the still picture character address selection circuit 47 before being supplied as the vertical address VA0—VA9 to the character RAM 7a in the VRAM 7. It follows that the vertical address VA0—VA9 becomes the same for each mosaic designated by the vertical mosaic size. Thus throughout one mosaic, dot data (graphic data) is read from the same vertical address in the character RAM 7a. That is, the dot data on the first line of each mosaic is read from the character RAM 7a over a plurality of vertical lines (designated by the vertical mosaic size data). In this manner, a vertical mosaic display is accomplished.

In the horizontal mosaic control circuit 93, the horizontal mosaic size data inverted by the NOT circuit 103 is preset to the four-bit counter 108. The four-bit counter 108 is incremented at every dot (i.e., every timing signal 5M) on the screen of the raster scan monitor 8. Thus the four-bit counter 108 outputs a carry signal at the leftmost dot of each mosaic defined by the horizontal mosaic size. In response, the AND gate 112 provides a "1" on every timing signal 5M. This output is sent to the inputs on the one side of the OR gates 104 through 107.

Meanwhile, the bits constituting the mosaic enable data from the NOT circuit 103 are fed to the inputs on the other side of the OR gates 104 through 107. This causes the corresponding NAND gate among 98 through 101 to output a latch signal at the beginning of each mosaic designated by the mosaic size data for the still picture cell enabled for mosaic display. As a result, the corresponding latch among 94 through 97 latches the dot data. This state persists until the end of each mosaic. Thus the dots constituting each mosaic provide a display of the same picture as is defined by the dot data at the beginning of the mosaic. In this manner, a horizontal mosaic display is achieved.

Figure 23:
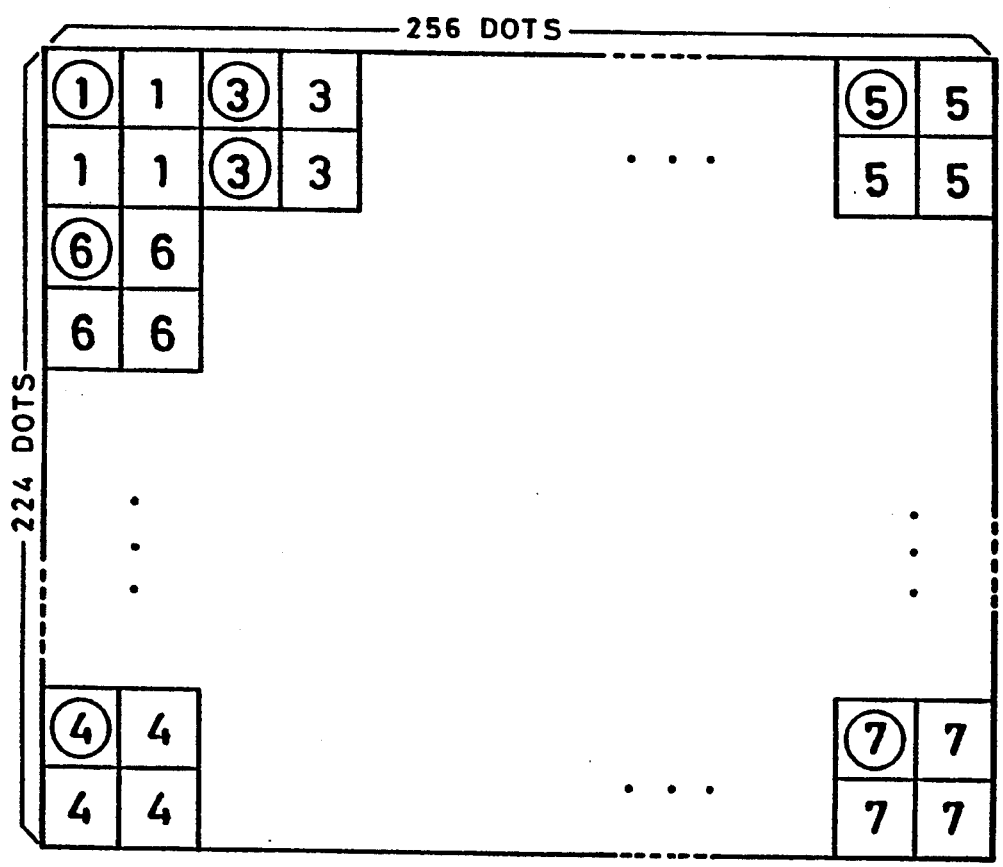
FIG. 23 is an illustrative view showing an example of mosaic picture display.

FIG. 23 shows a typical mosaic picture in effect when the mosaic size data is set to "0010" in the first mode. In the processes described, the dots of each mosaic represent a display with the same color data as for the encircled bottom left dot in the figure.

In addition, a memory cartridge incorporating a semiconductor memory is used as an external storage unit in the above described embodiments; however, it is possible to use an external storage unit such as a CD-ROM in the present invention. In a case of use of the memory cartridge, the program data including the character data of the moving picture characters and the still picture characters and the aforementioned mosaic size data are stored in the semiconductor memory, and the CPU 2 generates control data for the moving picture characters and the still (background) picture characters on the basis of the program data read from the semiconductor memory and outputs the same to the components of the picture processing unit 1.

In contrast, in a case of use of the CD-ROM, the above described program data including the mosaic size data are optically recorded as digital data in the CD-ROM (not shown). In addition, an optical reader for optically reading recorded date on the CD-ROM is connected to a suitable connector such as a expansion connector. Even if the CD-ROM is used as the external storage unit, a memory cartridge is also used. In this case, the memory cartridge is comprised with a ROM (not shown) that stores a starting program for controlling an operation of the optical reader, a buffer RAM (not shown) for temporarily storing the data read from the CD-ROM, and etc. Then, prior to a start of a display operation, the CPU 2 applies control data to the optical reader on the basis of the starting program of the ROM to cause the optical reader to read the recorded data of the CD-ROM. A portion of the character data read from the CD-ROM is transferred to the character RAM and the program data is transferred to the buffer RAM included in the memory cartridge. The CPU 2 controls the components of the picture processing unit 1 on the basis of the program data stored in the buffer RAM. That is, after the data read from the CD-ROM by the optical reader has been transferred to the respective memories, the CPU 2 and the picture processing unit 1 execute the display operation by accessing the respective memories as done in the previous embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mosaic picture display apparatus for mosaically displaying on a raster scan monitor a still picture containing an arrangement of a predetermined number of characters each made of a predetermined number of dots in combination, said apparatus comprising:

a first storing device for storing character data of said characters;

reading circuitry for periodically reading-out said character data from said first storing device in association with a clock signal which is generated for displaying dots in a horizontal direction on said raster scan monitor;

a format converter for converting to bit serial data said character data which is read by said reading circuitry;

first mosaic size data outputting circuitry for designating a period during which said bit serial character data outputted by said format converter is to be held by outputting horizontal mosaic size data corresponding to the number of dots in the horizontal direction to be mosaically displayed on a screen of said raster scan monitor;

control signal generating circuits for receiving said horizontal mosaic size data and for controlling a period during which said bit serial character data outputted by said format converter is held by outputting, in accordance with said horizontal mosaic size data, a control signal indicative of a starting end dot data in the horizontal direction of each mosaic at every timing when said raster scan monitor is scanned by the dots whose number in the horizontal direction corresponds to said horizontal mosaic size data;

holding circuits for temporarily holding only the starting end dot data of the bit serial character data outputted from said format converter in response to said control signal and continuously outputting said starting end dot data until a succeeding control signal is applied thereto from said control signal generating circuits; and signal generating circuitry for generating a video signal in accordance with only said starting end dot data from said holding circuits and supplying said raster scan monitor with said video signal.

2. A mosaic picture display apparatus according to claim 1, wherein said control signal generating circuits include a first counter for changing a count value thereon for each dot on said screen of said raster scan monitor.

3. A mosaic picture display apparatus according to claim 1, further comprising second mosaic size data outputting circuitry for outputting vertical mosaic size data corresponding to the number of dots in the vertical direction to be mosaically displayed on said screen of said raster scan monitor;

wherein said reading circuitry includes addressing circuits for designating for each mosaic an address in said first storing device in accordance with said vertical mosaic size data, said address corresponding to the start of said mosaic in said vertical direction.

4. A mosaic picture display apparatus according to claim 3, wherein said addressing circuits includes a second counter for changing a count value thereon for each line on said raster scan monitor.

5. A mosaic picture display apparatus according to claim 1, further comprising a second storing device for storing a character code of each of the characters constituting said still picture;

wherein said first storing device stores graphic data designated by the character code which is read from said second storing device.

6. An external storage unit used for a mosaic picture display apparatus which mosaically displays on a raster scan monitor a still picture containing an arrangement of a predetermined number of characters each made of a predetermined number of dots, said external storage unit comprising:

first storing means for storing character data of said characters; and first mosaic size data outputting means for designating a period during which bit serial character data outputted by a register means of said mosaic picture display apparatus is to be held by outputting horizontal mosaic size data corresponding to the number of dots in the horizontal direction to be mosaically displayed on a screen of said raster scan monitor;

said mosaic display apparatus including reading means for periodically reading-out said character data from said first storing means in association with a clock signal which is generated for displaying dots in a horizontal direction on said raster scan monitor; said register means converting to bit serial data said character data which is read by said reading means; control signal generating means for receiving said horizontal mosaic size data and for controlling a period during which said bit serial character data outputted by said register means is held by outputting, in accordance with said horizontal mosaic size data read from said external storage unit, a control signal indicative of a starting end dot data in the horizontal direction of each mosaic at every timing when said raster scan monitor is scanned by the dots whose number in the horizontal direction corresponds to said horizontal mosaic size data;

holding means for temporarily holding only the starting end dot data of the bit serial character data outputted from said register means in response to said control signal and continuously outputting said starting end dot data until a succeeding control signal is applied thereto from said control means; and means for generating a video signal in accordance with only said starting end dot data from said holding means and supplying said raster scan monitor with said video signal.

7. An external storage unit according to claim 6, further comprising second mosaic size data outputting means for outputting vertical mosaic size data corresponding to the number of dots in the vertical direction to be mosaically displayed on said screen of said raster scan monitor;

wherein said reading means includes addressing means for designating for each mosaic an address in said first storing means in accordance with said vertical mosaic size data, said address corresponding to the start of said mosaic in said vertical direction.

* * * * *